US012494013B2

United States Patent
Ntavelis et al.

(10) Patent No.: US 12,494,013 B2
(45) Date of Patent: Dec. 9, 2025

(54) AUTODECODING LATENT 3D DIFFUSION MODELS

(71) Applicant: Snap Inc., Santa Monica, CA (US)

(72) Inventors: Evangelos Ntavelis, Los Angeles, CA (US); Kyle Olszewski, Los Angeles, CA (US); Aliaksandr Siarohin, Los Angeles, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 251 days.

(21) Appl. No.: 18/211,149

(22) Filed: Jun. 16, 2023

(65) Prior Publication Data

US 2024/0420407 A1    Dec. 19, 2024

(51) Int. Cl.
    *G06T 15/08*      (2011.01)
    *G06N 3/0455*      (2023.01)
    (Continued)

(52) U.S. Cl.
     CPC ........... *G06T 15/08* (2013.01); *G06N 3/0455* (2023.01); *G06N 3/08* (2013.01); *G06T 9/001* (2013.01);
(Continued)

(58) Field of Classification Search
     CPC ......... G06T 15/08; G06T 9/001; G06T 15/20; G06T 19/20; G06T 2210/21;
(Continued)

(56) References Cited

U.S. PATENT DOCUMENTS

2019/0370965 A1*   12/2019   Lay ................. G06N 20/00
2020/0058137 A1*   2/2020   Pujades ................. G06V 40/23
(Continued)

OTHER PUBLICATIONS

Gupta, Anchit, et al. "3dgen: Triplane latent diffusion for textured mesh generation." arXiv preprint arXiv:2303.05371 (2023). (Year: 2023).*

(Continued)

*Primary Examiner* — Kent W Chang
*Assistant Examiner* — Karl Duc Truong
(74) *Attorney, Agent, or Firm* — CM Law; Stephen J. Weed

(57) ABSTRACT

Systems and methods for generating static and articulated 3D assets are provided that include a 3D autodecoder at their core. The 3D autodecoder framework embeds properties learned from the target dataset in the latent space, which can then be decoded into a volumetric representation for rendering view-consistent appearance and geometry. The appropriate intermediate volumetric latent space is then identified and robust normalization and de-normalization operations are implemented to learn a 3D diffusion from 2D images or monocular videos of rigid or articulated objects. The methods are flexible enough to use either existing camera supervision or no camera information at all—instead efficiently learning the camera information during training. The generated results are shown to outperform state-of-the-art alternatives on various benchmark datasets and metrics, including multi-view image datasets of synthetic objects, real in-the-wild videos of moving people, and a large-scale, real video dataset of static objects.

19 Claims, 9 Drawing Sheets

(51) Int. Cl.
G06N 3/08 (2023.01)
G06T 9/00 (2006.01)
G06T 15/20 (2011.01)
G06T 19/20 (2011.01)

(52) U.S. Cl.
CPC .............. *G06T 15/20* (2013.01); *G06T 19/20* (2013.01); *G06T 2210/21* (2013.01); *G06T 2219/2016* (2013.01); *G06T 2219/2021* (2013.01)

(58) Field of Classification Search
CPC ..... G06T 2219/2016; G06T 2219/2021; G06T 13/40; G06T 17/00; G06N 3/0455; G06N 3/08; G06N 3/045; G06V 10/82; G06V 20/64

See application file for complete search history.

(56) References Cited

U.S. PATENT DOCUMENTS

| | | | | |
|---|---|---|---|---|
| 2023/0130281 | A1* | 4/2023 | Brown | G06N 3/04 345/420 |
| 2024/0005590 | A1* | 1/2024 | Martin Brualla | G06T 15/20 |
| 2024/0013497 | A1* | 1/2024 | Sun | G06T 19/20 |
| 2024/0096001 | A1* | 3/2024 | Sajjadi | G06T 15/06 |
| 2024/0221258 | A1* | 7/2024 | Chai | G06T 7/70 |
| 2024/0371081 | A1* | 11/2024 | Matthews | G06T 15/20 |
| 2024/0371096 | A1* | 11/2024 | Khamis | G06V 10/56 |

OTHER PUBLICATIONS

Devadas, Daskalakis. âLecture 5: Hashing I: Chaining, Hash Functions. â MIT, 2009, courses.csail.mit.edu/6.006/fall09/lecture_notes/lecture05.pdf. (Year: 2009).*
Zhu, K. P., et al. "3D CAD model search: a regularized manifold learning approach." 2009 IEEE International Conference on Robotics and Biomimetics (ROBIO). IEEE, 2009. (Year: 2009).*
Nam, Gimin, et al. "3d-Ldm: Neural implicit 3d shape generation with latent diffusion models." arXiv preprint arXiv:2212.00842 (2022). (Year: 2022).*
Wang, Tengfei, et al. "Rodin: a Generative Model for Sculpting 3D Digital Avatars Using Diffusion." arXiv preprint arXiv:2212.06135 (2022). (Year: 2022).*
Ntavelis, Evangelos, et al. "Autodecoding latent 3d diffusion models." Advances in Neural Information Processing Systems 36 (2023): 67021-67047. (Year: 2023).*
Achlioptas et al.: Learning Representations and Generative Models for 3D Point Clouds. In Proceedings of the International Conference on Machine Learning, 2018.
Binkowski et al.: Demystifying MMD GANs. In Proceedings of the IEEE Conference on Computer Vision and Pattern Recognition, 2018.
Bojanowski et al.: Optimizing the latent space of generative networks. In arXiv, 2017.
Brock et al.: Large scale gan training for high fidelity natural image synthesis. In arXiv, 2018.
Chan et al.: Efficient Geometry-aware 3D Generative Adversarial Networks. In Proceedings of the IEEE Conference on Computer Vision and Pattern Recognition, 2022.
Chan et al: pi-GAN: Periodic Implicit Generative Adversarial Networks for 3D-Aware Image Synthesis. In Proceedings of the IEEE Conference on Computer Vision and Pattern Recognition, 2021.
Chang et al.: ShapeNet: an Information-Rich 3D Model Repository. In arXiv, 2015.
Chen et al.: Fantasia3D: Disentangling Geometry and Appearance for High-quality Text-to-3D Content Creation. In arXiv, 2023.
Chen et al.: WaveGrad: Estimating Gradients for Waveform Generation. In Proceedings of the IEEE Conference on Computer Vision and Pattern Recognition, 2021.
Cheng et al.: SDFusion: Multimodal 3d shape completion, reconstruction, and generation. In Proceedings of the IEEE Conference on Computer Vision and Pattern Recognition, 2023.
Collins et al.: ABO: Dataset and Benchmarks for Real-World 3D Object Understanding. In Proceedings of the IEEE Conference on Computer Vision and Pattern Recognition, 2022.
Deitke et al.: Objaverse: a Universe of Annotated 3D Objects. In arXiv, 2022.
Deng et al.: Imagenet: a large-scale hierarchical image database. In Proceedings of the IEEE Conference on Computer Vision and Pattern Recognition, 2009.
Devadas et al. MIT 6.006, Lecture 5: Hashing I: Chaining, Hash Functions, 2009.
Dhariwal et al.: Diffusion Models Beat Gans on Image Synthesis. In Proceedings of the Neural Information Processing Systems Conference, 2021.
Dockhorn et al.: Score-based generative modeling with critically-damped langevin diffusion. In Proceedings of the IEEE Conference on Computer Vision and Pattern Recognition, 2022.
Falcon et al. PyTorch Lightning. GitHub. Note: https://github.com/PyTorchLightning/pytorch-lightning, 3, 2019.
Forsgren et al.: Riffusion—Stable diffusion for real-time music generation, 2022. URL https://riffusion.com/about.
Goodfellow et al.: Generative adversarial nets. In Proceedings of the Neural Information Processing Systems Conference, 2014.
Harvey et al.: Flexible Diffusion Modeling of Long Videos. In Proceedings of the Neural Information Processing Systems Conference, 2022.
He et al.: Latent video diffusion models for high-fidelity long video generation. In arXiv, 2023.
Heusel et al.: GANs Trained by a Two Time-Scale Update Rule Converge to a Local Nash Equilibrium. In Proceedings of the Neural Information Processing Systems Conference, 2017.
Ho et al.: Classifier-free diffusion guidance. In arXiv, 2022.
Ho et al.: Denoising diffusion probabilistic models. In Proceedings of the Neural Information Processing Systems Conference, 2020.
Ho et al.: Video Diffusion Models. In Proceedings of the IEEE Conference on Computer Vision and Pattern Recognition, 2022.
Hore et al.: Image quality metrics: Psnr vs. ssim. In Proceedings of the International Conference on Pattern Recognition, 2010.
International Search Report and Written Opinion for PCT/U2024/032242 dated Sep. 19, 2024 (Sep. 19, 2024), 9 pages.
Johnson et al.: Perceptual Losses for Real-Time Style Transfer and Super-Resolution. In Proceedings of the European Conference on Computer Vision, 2016.
Karras et al.: Analyzing and Improving the Image Quality of StyleGAN. In Proceedings of the IEEE Conference on Computer Vision and Pattern Recognition, 2020.
Karras et al.: Elucidating the Design Space of Diffusion-Based Generative Models. In Proceedings of the Neural Information Processing Systems Conference, 2022.
Karras et al.: A style-based generator architecture for generative adversarial networks. In Proceedings of the IEEE Conference on Computer Vision and Pattern Recognition, 2019.
Karras et al.: Progressive growing of GANs for improved quality, stability, and variation. In Proceedings of the IEEE Conference on Computer Vision and Pattern Recognition, 2018.
Karras et al.: Training generative adversarial networks with limited data. In arXiv, 2020.
Kingma et al.: Adam: a Method for Stochastic Optimization. In Proceedings of the IEEE Conference on Computer Vision and Pattern Recognition, 2015.
Kingma et al.: Auto-encoding variational bayes. In Proceedings of the IEEE Conference on Computer Vision and Pattern Recognition, 2014.
Kirillov et al.: Segment Anything. In arXiv, 2023.
Lepetit et al.: EPnP: an Accurate O(n) Solution to the PnP Problem. In International Journal of Computer Vision, 2009.
Lewis et al.: Pose Space Deformation: a Unified Approach to Shape Interpolation and Skeleton-Driven Deformation. In ACM Transactions on Graphics, 2000.

(56) References Cited

OTHER PUBLICATIONS

Lin et al.: BARF: Bundle-Adjusting Neural Radiance Fields. In Proceedings of the IEEE International Conference on Computer Vision, 2021.
Lin et al.: Robust High-Resolution Video Matting with Temporal Guidance. In Proceedings of the Winter Conference on Applications of Computer Vision, 2022.
Lin et al.: Magic3D: High-Resolution Text-to-3D Content Creation. In Proceedings of the IEEE Conference on Computer Vision and Pattern Recognition, 2023.
Liu et al.: Grounding DINO: Marrying DINO with Grounded Pre-Training for Open-Set Object Detection. In arXiv, 2023.
Lorensen et al.: Marching Cubes: a High Resolution 3D Surface Construction Algorithm. In ACM Transactions on Graphics, 1987.
Mei et al.: VIDM: Video Implicit Diffusion Models. In Association for the Advancement of Artificial Intelligence Conference, 2023.
Mildenhall et al.: NeRF: Representing scenes as Neural Radiance Fields for View Synthesis. In Proceedings of the European Conference on Computer Vision, 2020.
Müller et al.: DiffRF: Rendering-Guided 3D Radiance Field Diffusion. In Proceedings of the IEEE Conference on Computer Vision and Pattern Recognition, 2023.
Nagrani et al.: VoxCeleb: Large-scale speaker verification in the wild. Computer Science and Language, 2019.
Nam et al: "3D-LDM: Neural Implicit 3D Shape Generation with Latent Diffusion Models", Arxiv.org, Cornell University Library, 201 Olin Library Cornell University Ithaca, NY 14853, Dec. 15, 2022 (Dec. 15, 2022), XP091384293.
Nguyen-Phuoc et al.: HoloGAN: Unsupervised Learning of 3D Representations From Natural Images. In Proceedings of the IEEE International Conference on Computer Vision, 2019.
Nguyen-Phuoc et al.; Blockgan: Learning 3d object-aware scene representations from unlabelled images. In arXiv, 2020.
Nichol et al.: Improved denoising diffusion probabilistic models. In ICML, 2021.
Niemeyer et al.: GIRAFFE: Representing Scenes as Compositional Generative Neural Feature Fields. In Proceedings of the IEEE Conference on Computer Vision and Pattern Recognition, 2021.
Ntavelis et al.: StyleGenes: Discrete and Efficient Latent Distributions for GANs. In arXiv, 2023.
Ntavelis, Evangelos et al. "Autodecoding Latent 3D Diffusion Models," arXiv:2307.05445v1 [cs.CV] Jul. 7, 2023z.
Obukhov et al.: High-fidelity performance metrics for generative models in PyTorch, 2020. URL https://github.com/toshas/torch-fidelity. Version: 0.3.0, DOI: 10.5281/zenodo.4957738.
Park et al.: PhotoShape: Photorealistic Materials for Large-Scale Shape Collections. In ACM Transactions on Graphics, 2018.
Park et al: "DeepSDF: Learning Continuous Signed Distance Functions for Shape Representation", 2019 IEEE/CVF Conference on Computer Vision and Pattern Recognition (CVPR), IEEE, Jun. 15, 2019 (Jun. 15, 2019), pp. 165-174, XP033687152.
Paszke et al.: Automatic Differentiation in PyTorch, 2017.
Paszke et al.: PyTorch: an Imperative Style, High-Performance Deep Learning Library. In Proceedings of the Neural Information Processing Systems Conference, 2019.
Poole et al.: Dreamfusion: Text-to-3d using 2d diffusion. In arXiv, 2022.
Raffel et al.: Exploring the Limits of Transfer Learning with a Unified Text-to-Text Transformer. In The Journal of Machine Learning Research, 2020.
Ravi et al.: Accelerating 3D Deep Learning with PyTorch3D. In arXiv, 2020.
Rombach et al.: High-Resolution Image Synthesis With Latent Diffusion Models. In Proceedings of the IEEE Conference on Computer Vision and Pattern Recognition, 2022.
Schönberger et al.: Structure-from-Motion Revisited. In Proceedings of the IEEE Conference on Computer Vision and Pattern Recognition, 2016.
Schwarz et al.: GRAF: Generative Radiance Fields for 3D-Aware Image Synthesis. In Proceedings of the Neural Information Processing Systems Conference, 2020.
Siarohin et al.: First Order Motion Model for Image Animation. In Proceedings of the Neural Information Processing Systems Conference, 2019.
Siarohin et al.: Unsupervised Volumetric Animation. In Proceedings of the IEEE Conference on Computer Vision and Pattern Recognition, 2023.
Siarohin et al: "Unsupervised Volumetric Animation", Arxiv.org, Cornell University Library, 201 Olin Library Cornell University Ithaca, NY 14853, Jan. 26, 2023 (Jan. 26, 2023), XP091421870.
Simonyan et al.: Very deep convolutional networks for large-scale image recognition. In arXiv, 2014.
Skorokhodov et al.: 3D Generation on ImageNet. In Proceedings of the IEEE Conference on Computer Vision and Pattern Recognition, 2023.
Skorokhodov et al.: Stylegan-v: a continuous video generator with the price, image quality and perks of stylegan2. In Proceedings of the IEEE Conference on Computer Vision and Pattern Recognition, 2022.
Skorokhodov et al.: EpiGRAF: Rethinking Training of 3D GANs. In Proceedings of the Neural Information Processing Systems Conference, 2022.
Sohl-Dickstein et al.: Deep unsupervised learning using nonequilibrium thermodynamics. In ICML, 2015.
Song et al.: Denoising Diffusion Implicit Models. In Proceedings of the IEEE Conference on Computer Vision and Pattern Recognition, 2021.
Song et al.: Generative modeling by estimating gradients of the data distribution. In Proceedings of the Neural Information Processing Systems Conference, 2019.
Song et al.: Score-based generative modeling through stochastic differential equations. In Proceedings of the IEEE Conference on Computer Vision and Pattern Recognition, 2021.
Tian et al.: A good image generator is what you need for high-resolution video synthesis. In Proceedings of the IEEE Conference on Computer Vision and Pattern Recognition, 2021.
Vahdat et al.: Score-based generative modeling in latent space. In Proceedings of the Neural Information Processing Systems Conference, 2021.
Vaswani et al.: Attention is all you need. In Proceedings of the Neural Information Processing Systems Conference, 2017.
Voleti et al.: MCVD: Masked Conditional Video Diffusion for Prediction, Generation, and Interpolation. In Proceedings of the Neural Information Processing Systems Conference, 2022.
Wang et al.: NeRF—: Neural Radiance Fields Without Known Camera Parameters. In arXiv, 2021.
Weng et al.: HumanNeRF: Free-Viewpoint Rendering of Moving People from Monocular Video. In Proceedings of the IEEE Conference on Computer Vision and Pattern Recognition, 2022.
Whaley: The Interquartile Range: Theory and Estimation. PhD thesis, East Tennessee State University, 2005.
Xiao et al.: Tackling the generative learning trilemma with denoising diffusion GANs. In Proceedings of the IEEE Conference on Computer Vision and Pattern Recognition, 2022.
Xu et al.: Pose for Everything: Towards Category-Agnostic Pose Estimation. In Proceedings of the European Conference on Computer Vision, 2022.
Xue et al.: GIRAFFE HD: a High-Resolution 3D-aware Generative Model. In Proceedings of the IEEE Conference on Computer Vision and Pattern Recognition, 2022.
Yin et al.: NUWA-XL: Diffusion over Diffusion for extremely Long Video Generation. In arXiv, 2023.
Yu et al.: CelebV-Text: a Large-Scale Facial Text-Video Dataset. In Proceedings of the IEEE Conference on Computer Vision and Pattern Recognition, 2023.
Yu et al.: Generating videos with dynamics-aware implicit generative adversarial networks. In Proceedings of the IEEE Conference on Computer Vision and Pattern Recognition, 2022.
Yu et al.: MVImgNet: a Large-scale Dataset of Multi-view Images. In arXiv, 2023.

(56) References Cited

OTHER PUBLICATIONS

Zhang et al.: The Unreasonable Effectiveness of Deep Features as a Perceptual Metric. In Proceedings of the IEEE Conference on Computer Vision and Pattern Recognition, 2018.
Zhu et al.: Discrete contrastive diffusion for cross-modal music and image generation. In Proceedings of the IEEE Conference on Computer Vision and Pattern Recognition, 2023.
Zhu et al.: MiniGPT-4: Enhancing Vision-Language Understanding with Advanced Large Language Models. In arXiv, 2023.

* cited by examiner

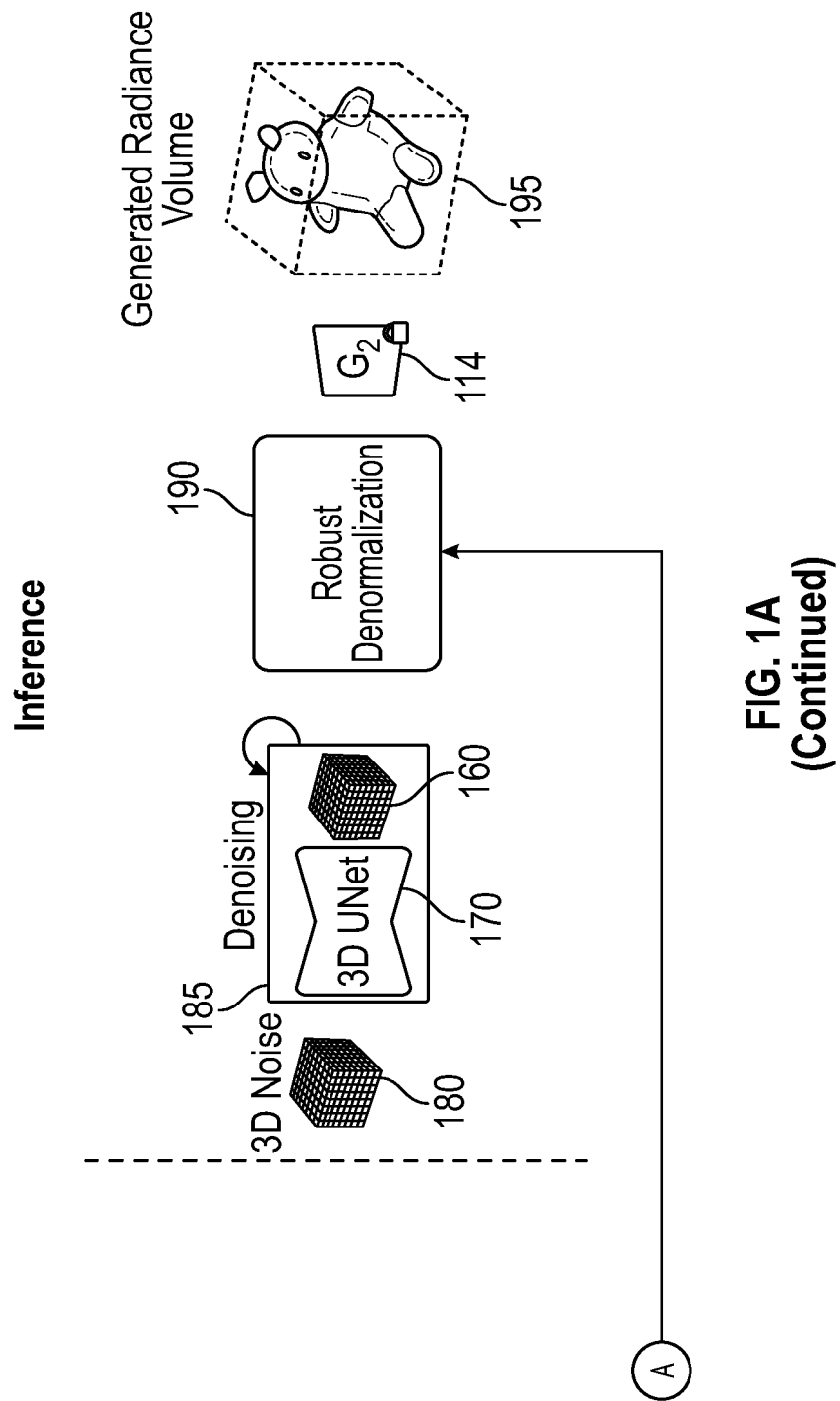

AUTODECODING LATENT 3D DIFFUSION MODELS

TECHNICAL FIELD

Examples set forth herein generally relate to the generation of static and articulated three-dimensional (3D) images and, in particular, to methods and systems for autodecoding latent 3D diffusion models to embed properties learned from a target dataset in the latent space into a volumetric representation for rendering.

BACKGROUND

Photorealistic generation is undergoing rapid improvement. Recent improvements in quality, composition, stylization, resolution, scale, and manipulation capabilities of images were unimaginable just over a year ago. The abundance of online images, often enriched with text, labels, tags, and sometimes per-pixel segmentation, has significantly accelerated such progress. The emergence and development of denoising diffusion probabilistic models (DDPMs) have propelled these advances in image synthesis and other domains such as audio and video.

However, the world is 3D, consisting of static and dynamic objects. Its geometric and temporal nature poses a challenge for generative methods. First of all, the available data consists mainly of images and monocular videos. For some limited categories of objects, 3D meshes with corresponding multi-view images or videos are available, often obtained using a tedious capturing process or created manually by artists. Second, unlike convolutional neural networks (CNNs), there is no widely accepted 3D or four-dimensional (4D) representation suitable for 3D geometry and appearance generation. As a result, with only a few exceptions, most of the existing 3D generative methods are restricted to a narrow range of object categories that are suitable to the available data and common geometric representations. Moving, articulated objects, e.g humans, compound the problem, as the representation must also support deformations.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1A:
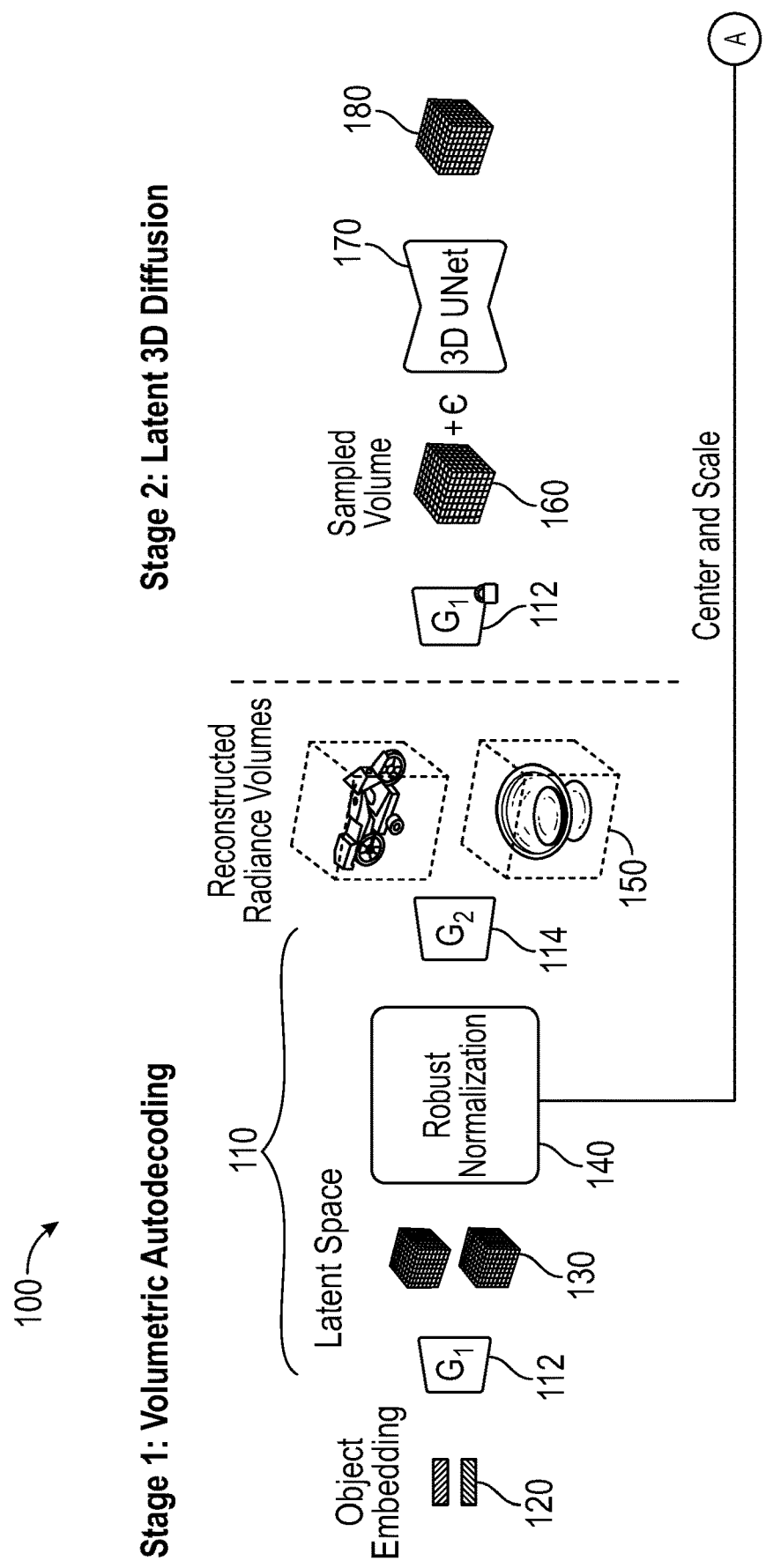
FIG. 1A is a diagram illustrating the full pipeline of a two-stage approach to autodecoding latent 3D diffusion models in a sample configuration.

A 3D autodecoder framework embeds properties learned from a target dataset in latent space for use in generating static and articulated 3D assets. The 3D autodecoder framework can be decoded into a volumetric representation for rendering view-consistent appearance and geometry. The appropriate intermediate volumetric latent space is then identified and robust normalization and de-normalization operations are implemented to learn a 3D diffusion from 2D images or monocular videos of rigid or articulated objects. The results are shown to outperform state-of-the-art alternatives on various benchmark datasets and metrics, including multi-view image datasets of synthetic objects, real in-the-wild videos of moving people, and a large-scale, real video dataset of static objects.

The following description is directed to designing and training denoising diffusion probabilistic models (DDPMs) for 3D-aware content suitable for efficient usage with datasets of various scales. The described systems and methods are generic enough to handle both rigid and articulated objects and is versatile enough to learn diverse 3D geometry and appearance from multi-view images and monocular videos of both static and dynamic objects. Recognizing the poses of objects in such data is shown to be important to learning useful 3D representations. The systems and methods described herein are thus designed to be robust to the use of ground-truth poses, poses estimated using structure-from-motion, or using no input pose information at all, but rather learning the poses effectively during training. The described systems and methods are scalable enough to train on single- or multi-category datasets of large numbers of diverse objects suitable for synthesizing a wide range of realistic content.

Conventional diffusion methods consist of two stages. During a first stage, an autoencoder learns a rich latent space. To generate new samples, a diffusion process is trained during a second stage to explore this latent space. To train an image-to-image autoencoder, many images are needed. Similarly, training 3D autoencoders requires large quantities of 3D data, which is scarce. Existing systems have used synthetic datasets such as ShapeNet, DiffRF, SDFusion, and the like, and were thus restricted to domains where such data is available.

In contrast to such methods, the systems and methods described herein use a volumetric autodecoder to learn the latent space for diffusion sampling. In contrast to the autoencoder-based methods of the prior art, an autodecoder maps a one-dimensional (1D) vector to each object in the training set, and thus does not require 3D supervision. The autodecoder learns 3D representations from two-dimensional (2D) observations, using rendering consistency as supervision. Following unsupervised volumetric animation (UVA), the resulting 3D representation supports the articulated parts necessary to model non-rigid objects.

There are several challenges to learning such a rich, latent 3D space with an autodecoder that are addressed by the systems and methods described herein. First, the autodecoders do not have a clear "bottleneck." Starting with a 1D embedding, the autodecoders upsample the latent features at many resolutions, until finally reaching the output radiance and density volumes. Here, each intermediate volumetric representation could potentially serve as a "bottleneck." Second, autoencoder-based methods typically regularize the bottleneck by imposing a KL-Divergence constraint, meaning diffusion is performed in a normalized space.

To identify the best scale, one can perform an exhaustive layer-by-layer search. However, such a search is very computationally expensive as it requires running hundreds of computationally expensive experiments. Instead, the systems and methods described herein use robust normalization and denormalization operations that can be applied to any layers of a pre-trained and fixed autodecoder. These operations compute robust statistics to perform layer normalization and thus allow the diffusion process to be trained at any intermediate resolution of the autodecoder. The inventors have discovered that at fairly low resolutions, the space is compact and provides the necessary regularization for geometry, allowing the training data to contain only sparse observations of each object. The deeper layers, on the other hand, operate more as upsamplers.

The versatility and scalability of the systems and methods described herein are demonstrated on various tasks involving rigid and articulated 3D object synthesis. The model is initially trained using multi-view images and cameras. The model is then scaled to hundreds of thousands of diverse objects trained using the real-world MVImgNet dataset, which is beyond the capacity of prior 3D diffusion methods. Finally, the model is trained on a subset of CelebV-Text, consisting of approximately 44,000 sequences of high-quality videos of human motion.

Neural radiance fields (NeRFs) enable high-quality novel view synthesis (NVS) of rigid scenes learned from 2D images. The NeRFss approach to volumetric neural rendering has been successfully applied to various tasks, including generating objects suitable for 3D-aware NVS. Inspired by the rapid development of generative adversarial models (GANs) for generating 2D images and videos, subsequent work in the prior art extends them to 3D content generation with neural rendering techniques. Such works have shown promising results for this task, yet they suffer from limited multi-view consistency from arbitrary viewpoints and experience difficulty in generalizing to multi-category image datasets.

Existing techniques for estimating gradients for waveform generation, known as Pi-GAN, employ neural rendering with periodic activation functions for generation with view-consistent rendering. However, such an approach requires a precise estimate of the dataset camera pose distribution, limiting its suitability for free-viewpoint videos. EG3D and EpiGRAF use tri-plane representations of 3D scenes created by a generator-discriminator framework based on StyleGAN2. However, these techniques require pose estimation from keypoints (e.g., facial features) for training, again limiting the viewpoint range.

Existing methods primarily generate content within one object category with limited variation in shape and appearance. A notable exception is 3DGP, which generalizes to ImageNet. However, the reliance by 3DGP on monocular depth prediction limits it to generating front-facing scenes. These limitations also prevent these approaches from addressing deformable, articulated objects. As will be explained below, the systems and methods described herein are applicable to both deformable and rigid objects and cover a wider range of viewpoints.

Denoising diffusion probabilistic models (DDPMs) represent the generation process as the learned denoising of data progressively corrupted by a sequence of diffusion steps. Conventional techniques improving the training objectives, architecture, and sampling process have demonstrated rapid advances in high-quality data generation on various data domains. However, such techniques have primarily shown results for tasks in which samples from the target domain are fully observable, rather than operating in those with only partial observations of the dataset content.

One such domain is 3D data, which is primarily observed in 2D images for most real-world content. Some conventional methods have shown promising initial results in this area. DiffRF proposes reconstructing per-object NeRF volumes for synthetic datasets, then applying diffusion training on them within a U-Net framework. However, DiffRF requires the reconstruction of many object volumes and is limited to low-resolution volumes due to the diffusion training's high computational cost. By contrast, the framework described below instead operates in the latent space of the autodecoder and effectively shares the learned knowledge from all training data, thus enabling low-resolution, latent 3D diffusion. A 3D autoencoder has been previously used for generating 3D shapes, but such methods require ground-truth 3D supervision and only focus on shape generation, with textures added using an off-the-shelf method. In contrast, the framework described below learns to generate the surface appearance and corresponding geometry without such ground-truth 3D supervision.

Recently, other existing methods propose using large-scale, pre-trained text-to-image 2D diffusion models for 3D generation. The key idea behind these methods is to use 2D diffusion models to evaluate the quality of renderings from randomly sampled viewpoints, then use this information to optimize a 3D-aware representation of the content. However, compared to the methods described below, such methods require a far more expensive optimization process to generate each novel object.

The present disclosure addresses the above and other limitations in the prior art by providing systems, methods, and instructions on computer readable media to implement methods of training a three-dimensional (3D) diffusion model to embed properties from two-dimensional (2D) images learned from a target dataset in a latent space using an autodecoder. The system includes a volumetric autodecoder (G) that learns embedding vectors of a library of embedding vectors corresponding to objects in a training dataset to generate a latent 3D feature volume and decodes the latent 3D feature volume into a 3D voxel grid for density and radiance representative of an object's shape and appearance. In sample configurations, the autodecoder includes a first part $G_1$ and a second part $G_2$. The system also trains the 3D diffusion model using the volumetric autodecoder. The 3D diffusion model operates in a 3D latent space obtained from the first part $G_1$ using volumetric rendering of the voxel grid with two-dimensional (2D) reconstruction supervision from training images in a training dataset to extract structure and appearance properties from the training dataset. In sample configurations, the second part $G_2$ of the volumetric autodecoder generates a 3D representation of the object from the structure and appearance properties extracted from the training dataset.

The volumetric autodecoder may progressively upsample the latent 3D feature volume to a desired resolution before decoding the upsampled latent 3D feature volume into the 3D voxel grid. The volumetric autodecoder also may perform robust normalization on the latent 3D feature volume before training the 3D diffusion model. The robust normalization may include taking a median m as a center of distribution of the latent 3D feature volume and approximating a scale of the latent 3D feature volume using a Normalized InterQuartile Range (IQR). Before using features F from the latent 3D feature volume for diffusion by the 3D diffusion model, the features may be normalized as normalized features $$\hat{F} = \frac{(F - m)}{IQR}.$$

Then, during inference, the features F may be denormalized from the structure and appearance properties extracted from the training dataset by the second part $G_2$ as $\hat{F} \times IQR + m$ prior to generating the 3D representation of the object.

In sample configurations, the embedding vectors are learned by the volumetric autodecoder and the volumetric autodecoder may provide at least four residual blocks at each resolution in the autodecoder and use self-attention layers in a second level of resolution $8^3$ and in a third level of resolution $16^3$ of the autodecoder.

In the sample configurations, the object may be in a canonical pose and the voxel grid may be trained using ground truth poses, poses estimated using structure from motion, or poses learned from the training dataset during training. The canonical pose may include a canonical voxel representation of a density grid that is a discrete representation of a density field and a canonical representation that represents a red, green, blue (RGB) radiance field. The density values and RGB values may be tri-linearly interpolated from the 3D voxel grid after decoding.

In further sample configurations, a background of the training images in the training dataset prior may be removed prior to training the 3D diffusion model to improve the training efficiency.

When the object is an articulated non-rigid object, a shape of the object and local motion may be modeled from dynamic poses as well as a corresponding non-rigid deformation of a local region. A differentiable Perspective-n-Point algorithm may estimate camera poses for each component of the non-rigid object and progressively refine estimated camera poses during training using a combination of learned 3D keypoints for each component of the non-rigid object and corresponding 2D projections predicted in each image. The components may be combined with plausible deformations using a learned volumetric linear blend skinning (LBS) algorithm having skinning weights for each component of the non-rigid object that are estimated during training of the 3D diffusion model.

In further configurations, each object in the training set may be represented by an embedding vector including a concatenation of smaller embedding vectors. A deterministic mapping from each training object index to its corresponding concatenated embedding vector may be implemented using a hashing function where for object index k, the corresponding embedding index is:

$$m(k) = [(a \cdot k) \bmod 2^w] \gg (w - r),$$

for a table having $2^r$ entries where w and a are heuristic hashing parameters used to reduce a number of collisions while maintaining an appropriate table size. A target non-rigid object also may be decomposed into $N_p$ regions, each containing $N_k K_p^{3D}$ points and corresponding $K_p^{2D}$ projections per image. The $N_k K_p^{3D}$ points may be shared across all non-rigid objects and the non-rigid objects may be aligned in a learned canonical space to allow for motion transfer between the non-rigid objects.

In the further configurations, the training may include extracting a text description of an object in the training dataset by providing a hint and a first view of the object along with a question requesting a description of a shape and color of the object for use in an inference stage to identify the object.

A detailed description of the methodology for autodecoding latent 3D diffusion models will now be described with reference to FIGS. 1-7. Although this description provides a detailed description of possible implementations, it should be noted that these details are intended to be exemplary and in no way delimit the scope of the inventive subject matter.

The methods and systems for autodecoding latent 3D diffusion models in exemplary configurations implement a two-stage approach. In the first stage, an autodecoder G containing a library of embedding vectors corresponding to the objects in the training dataset is learned. These vectors are first processed to create a low-resolution, latent 3D feature volume, which is then progressively upsampled and finally decoded into a voxelized representation of the generated object's shape and appearance. The resulting voxel grid is trained using volumetric rendering techniques on this volume, with 2D reconstruction supervision from the training images.

During the second stage, the autodecoder G is split into two parts, $G = G_2 \circ G_1$. The autodecoder is then employed to train a 3D diffusion model operating in the compact, 3D latent space obtained from $G_1$. Using the structure and appearance properties extracted from the autodecoder training dataset, this 3D diffusion process allows the voxel grid to be used to efficiently generate diverse and realistic 3D content.

FIG. 1A illustrates the full pipeline 100 of the two-stage approach in a sample configuration. Stage 1 (volumetric autodecoding) trains an autodecoder 110 having two generative components, $G_1$ 112 and $G_2$ 114. The autodecoder 110 learns to assign each training set object a 1D embedding 120 that is processed by $G_1$ into a latent volumetric space 130. Features of the latent volumes generated by $G_1$ 112 may be normalized into the same range by robust normalization 140 to allow for a uniform set of diffusion hyper-parameters in the sampled volume for all datasets and all trained autodecoders 110. $G_2$ 114 decodes these volumes in latent volumetric space 130 into larger radiance volumes 150 suitable for rendering. In Stage 2 (latent 3D diffusion), the autodecoder 110 parameters are frozen. The uniform set of diffusion hyper-parameters in the sampled volume 160 are then used to train the 3D denoising diffusion process (e.g., 3D U-Net) 170 to generate a 3D noise volume 180 from which the object is rendered by $G_2$ at inference time.

At inference time, $G_1$ 112 is not used, as the generated 3D noise volume 180 generated during stage 2 is randomly sampled, iteratively denoised using 3D U-Net 170 at 185, robust denormalization is performed at 190, and decoding is performed by $G_2$ 114 for rendering to produce the generated radiance volume 195.

The volumetric autodecoding architecture, training procedure and reconstruction losses for the autodecoder 110, and training and sampling strategies for 3D diffusion in the latent space 130 of the autodecoder 110 are described below.

Autodecoder Architecture

In sample configurations, a 3D voxel grid is used to represent the 3D structure and appearance of an object. It is assumed that the objects are in their canonical pose, such that the 3D representation is decoupled from the camera poses. This decoupling is desirable for learning compact representations of objects, and also serves as a constraint to learn meaningful 3D structure from 2D images without direct 3D supervision. Specifically, the canonical voxel representation may consist of a density grid $V^{Density} \in \mathbb{R}^{S^3}$ that is a discrete representation of the density field with resolution $S^3$, and $V^{RGB} \in \mathbb{R}^{S^3 \times 3}$ that represents the RGB radiance field. Volumetric rendering may be employed to integrate the radiance and opacity values along each view ray similar to NeRFs. In contrast to the original NeRF, however, rather than computing these local values using a multilayer perceptron (MLP), the density and RGB values may bee tri-linearly interpolated from the decoded voxel grids.

The 3D voxel grids for density and radiance, $V^{Density}$ and $V^{RGB}$, may be generated by a volumetric autodecoder G 110 that is trained using rendering supervision from 2D images. The method directly generates $V^{Density}$ and $V^{RGB}$, rather than intermediate representations such as feature volumes or tri-planes, as it is more efficient to render and ensures consistency across multiple views. It is noted that feature volumes and tri-planes include running an MLP pass for each sampled point, which may necessitate significant computational cost and memory during training and inference.

The autodecoder 110 is trained in the manner of large scale generative networks across various object categories from large-scale multi-view or monocular video datasets. The architecture of the autodecoder 110 is adapted such that the framework supports large scale datasets that pose a challenge in designing the architecture of the autodecoder 110 with the capability to generate high-quality 3D content across various categories. In order to represent each of the approximately 300,000 objects in the largest dataset, a very high-capacity autodecoder 110 is desired. For such purposes, a relatively basic decoder is extended to support the diverse shapes and appearances in the target datasets by increasing the length of the embedding vectors learned by the decoder from 64 to 1024 for the autodecoder 110. The number of residual blocks at each resolution in the autodecoder 110 also may be increased from 1 to 4. Also, to harmonize the appearance of the reconstructed objects, self-attention layers may be introduced in the second and third levels (resolutions $8^3$ and $16^3$).

Autodecoder Training

The autodecoder 110 is trained from image data through analysis-by-synthesis, with the primary objective of minimizing the difference between the rendered images of the autodecoder 110 and the training images. RGB color image C is rendered using volumetric rendering. Additionally, in order to supervise silhouettes of the objects, a 2D occupancy mask O is also rendered.

A pyramidal perceptual loss is employed on the rendered images as the primary reconstruction loss:

$$\mathcal{L}_{rec}(\hat{C}, C) = \sum_{l=0}^{L} \sum_{i=0}^{I} |VGG_i(D_l(\hat{C})) - VGG_i(D_l(C))|, \quad (1)$$

where $\hat{C}, C \in [0,1]^{H \times W \times 3}$ are the RGB rendered and training images of resolution H×W, respectively; $VGG_i$ is the $i^{th}$-layer of a pre-trained VGG-19 network; and operator $D_l$ downsamples images to the resolution for pyramid level l.

Since the methods described herein are interested in modeling single objects in sample configurations, in all the datasets considered, the background is removed. However, if the color of the object is black (which corresponds to the absence of density), the network can make the object semi-transparent. To improve the overall shape of the reconstructed objects, a foreground supervision loss may be used. Using binary foreground masks (estimated by an off-the-shelf matting method such as Segment Anything or synthetic ground-truth masks, depending on the dataset), an L1 loss is applied on the rendered occupancy map to match that of the mask corresponding to the image as follows:

$$\mathcal{L}_{seg}(\hat{O}, O) = \frac{1}{HW} \|O - \hat{O}\|_1, \quad (2)$$

where $\hat{O}, O \in [0,1]^{H \times W}$ are the inferred and ground-truth occupancy masks, respectively.

Because the resulting autodecoder 110 has a large capacity, generating a volume incurs much larger overhead compared to rendering an image based on this volume (which mostly consists of tri-linear sampling of the voxel cube). Thus, rather than rendering a single view for the canonical representation of the target object in each batch, 4 views are instead rendered for each object in the batch. This technique incurs no significant overhead and effectively increases the batch size four times. As an added benefit, this technique improves on the overall quality of the generated results, since it significantly reduce batch variance. This technique and the key architectural design choices are ablated below with respect to Table 2 to show their effect on the sample quality.

For articulated, non-rigid objects, e.g., videos of human subjects, a subject's shape and local motion may be modeled from dynamic poses, as well as the corresponding non-rigid deformation of local regions. It is assumed that these sequences can be decomposed into a set of $N_p$ smaller, rigid components (e.g., 10) whose poses can be estimated for consistent alignment in the canonical 3D space. The camera poses for each component are estimated and progressively refined during training, using a combination of learned 3D keypoints for each component of the depicted subject and the corresponding 2D projections predicted in each image. This estimation may be performed via a differentiable Perspective-n-Point (PnP) algorithm.

To combine these components with plausible deformations, a learned volumetric linear blend skinning (LBS) algorithm may be employed. A voxel grid $V^{LBS} \in \mathbb{R}^{S^3 \times N_p}$ may be introduced to represent the skinning weights for each deformation component. As it is assumed that there is no prior knowledge about the content or assignment of object components, the skinning weights for each component are also estimated during training.

Latent 3D Diffusion

The diffusion model architecture used by the systems and methods described herein extends prior art diffusion techniques in a 2D space to the latent 3D space. Its 2D operations, including convolutions and self-attention layers, are implemented in the 3D decoder space. In text-conditioning experiments, after the self-attention layer, a cross-attention layer that is similar is used.

One of the key observations using the methods described herein is that the features F in the latent space of the 3D autodecoder 110 have a bell-shaped distribution, which eliminates the need to enforce any form of prior on it. Operating in the latent space without a prior enables training a single autodecoder 110 for each of the possible latent diffusion resolutions. However, the feature distribution F has very long tails. This is hypothesised because the final density values inferred by the network do not have any natural bounds and thus can fall within any range. In fact, the network is encouraged to make such predictions, as they have the sharpest boundaries between the surface and empty regions. However, to allow for a uniform set of diffusion hyper-parameters for all datasets and all trained autodecoders 110, their features are normalized into the same range. This is equivalent to computing the center and the scale of the distribution. It is noted that, due to the very long-tailed feature distribution, typical mean and standard deviation statistics will be heavily biased. A robust alternative based on the feature distribution quantiles is thus proposed that takes the median m as the center of the distribution and approximates its scale using the Normalized InterQuartile Range (IQR) for a normal distribution: 0.7413×IQR. Before using the features F for diffusion, the features are normalized to $$\hat{F} = \frac{(F - m)}{IQR}.$$

During inference, when producing the final volumes, the features are de-normalized as $\hat{F} \times IQR + m$. This method is referred to herein as robust normalization.

During inference, the methods may rely upon the sampling method from Expressing Diffusion Models (EDM) in a common framework as described by Karras, et al. in "Elucidating the Design Space of Diffusion-Based Generative Models," (Arxiv.org/abs/2206.00364) with several slight modifications. The EDM's hyper-parameter matching the dataset's distribution is fixed to 0.5 regardless of the experiment, and the feature statistics are modified in the feature processing step. Classifier free guidance is also introduced for text-conditioning experiments. It was found that setting the weight equal to 3 yields good results across all datasets.

Figure 1B:
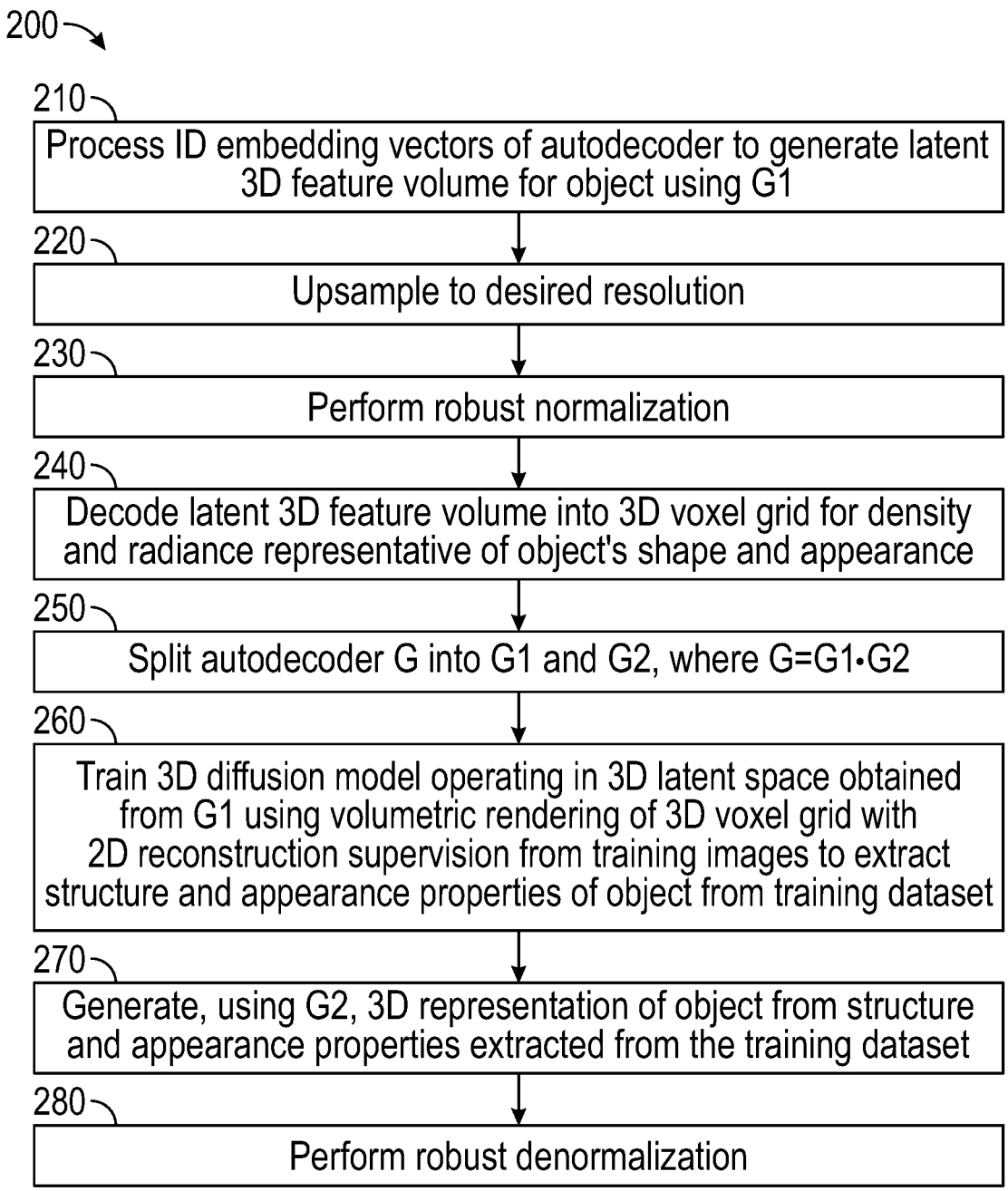
FIG. 1B is a flow chart illustrating the method of autodecoding latent three-dimensional (3D) diffusion models to embed properties learned from a target dataset in a latent space into a volumetric representation of an object for rendering in a sample configuration.

FIG. 1B is a flow chart illustrating the method 200 of autodecoding latent three-dimensional (3D) diffusion models to embed properties learned from a target dataset in a latent space into a volumetric representation of an object for rendering in a sample configuration. As illustrated, the method includes processing at 210 one dimensional (1D) embedding vectors 120 of an autodecoder (G) 110 comprising a library of embedding vectors corresponding to objects in a training dataset to generate a latent 3D feature volume 130. At 220, the latent 3D feature volume 130 is progressively upsampled to a desired resolution. At 230, robust normalization 140 is performed on the latent 3D feature volume 130 to normalize the features from the latent 3D feature volume 130 before decoding, at 240, the latent 3D feature volume 130 into a 3D voxel grid 150 for density and radiance representative of an object's shape and appearance.

At 250, the autodecoder 110 is split into a first part $G_1$ and a second part $G_2$ where $G = G_2 \circ G_1$. Then, at 260, the autodecoder 110 is used to train a 3D diffusion model 170 operating in a 3D latent space obtained from the first part $G_1$ using volumetric rendering of the 3D voxel grid 160 with two-dimensional (2D) reconstruction supervision from training images in a training dataset to extract structure and appearance properties of the object from the training dataset.

During inference, at 270, the second part $G_2$ of the autodecoder 110 uses the structure and appearance properties extracted from the training dataset to generate a 3D representation of the object. The features F of the object are denormalized using robust denormalization at 280 to complete the generation of the 3D representation of the object.

Results

As will be shown below, the methods described above have been evaluated on multiple diverse datasets for both unconditional and conditional settings. The design choices in the autodecoder 110 and diffusion are also ablated below.

The datasets used for evaluations of the methods are listed below. The methods were mostly evaluated on datasets of synthetic renderings of 3D objects. However, results are also provided for a challenging video dataset of dynamic human subjects and a dataset of static object videos. The datasets include:

ABO Tables. The methods were evaluated on renderings of objects from the Tables subset of the Amazon Berkeley Objects (ABO) dataset, consisting of 1,676 training sequences with 91 renderings per sequence, for a total of 152,516 renderings.

PhotoShape Chairs. Images from the Chairs subset of the PhotoShape dataset were used, totaling 3,115,200 frames, with 200 renderings for each of 15,576 chair models.

Objaverse. This dataset contains approximately 800,000 publicly available 3D models. As the object geometry and appearance varies, a manually-filtered subset of approximately 300,00 unique objects were used. Six images were rendered per training object, for a total of approximately 1.8 million frames.

MVImgNet. For this dataset, approximately 6.5 million frames were used from 219,188 videos of real-world objects from 239 categories, with an average of 30 frames each. Grounded Segment Anything was used for background removal, then filtering was applied to remove objects with failed segmentation. This process resulted in 206,990 usable objects.

CelebV-Text. The CelebV-Text dataset consists of approximately 70,000 sequences of high-quality videos of celebrities captured in in-the-wild environments, lighting, motion, and poses. They generally depict the head, neck, and upper-torso region, but contain more challenging pose and motion variation than prior datasets, e.g., VoxCeleb. A robust video matting framework was used to obtain the masks for foreground supervision. Some sample filtering was used for sufficient video quality and continuity for training. This produced approximately 44,400 unique videos, with an average of approximately 373 frames each, totaling approximately 16.6 million frames.

For training, the camera parameters used to render each synthetic object dataset and the estimated parameters provided for the real video sequences in MVImgNet, adjusted to center and scale the content to the rendering volume, were used. For the human videos in CelebV-Text, an additional pose estimator along with the autodecoder G 110 were trained to predict poses for each articulated region per frame, such that all objects can be aligned in the canonical space. It is noted that for creating dynamic 3D video, sequences of poses transferred from the real video of another person from the dataset can be used.

Synthetic Datasets. Results on the ABO Tables and PhotoShape Chairs datasets are shown in Table 1 below. These results on single-category, synthetically rendered datasets that are relatively small compared to the others, demonstrate that methods described herein also perform well with smaller, more homogeneous data. Ten views of 1000 samples from each dataset were rendered, and the Frèchet Inception Distance (FID) and the Kernel Inception Distance (KID) when compared to 10 randomly selected ground-truth images from each training sequence are shown. The results are shown in Table 1 compared to both GAN-based and more recent diffusion-based approaches. As shown, the disclosed methods significantly outperform state-of-the-art methods using both metrics on the Tables dataset, and achieves better or comparable results on the Chairs dataset. The KID scores are multiplied by $10^3$.

TABLE 1

|  | PhotoShape Chairs | | ABO Tables | |
| --- | --- | --- | --- | --- |
| Method | FID ↓ | KID ↓ | FID ↓ | KID ↓ |
| π-GAN [7] | 52.71 | 13.64 | 41.67 | 13.81 |
| EG3D [6] | 16.54 | 8.412 | 31.18 | 11.67 |
| DiffRF [44] | 15.95 | 7.935 | 27.06 | 10.03 |
| Disclosed Method | 11.28 | 4.714 | 18.44 | 6.854 |

Large-Scale Datasets. Tests were run on the large-scale datasets described above: MVImgNet, CelebV-Text and Objaverse. For each dataset, 5 images were rendered from random poses for each of 10,000 generated samples. The FID and KID for these experiments compared to 5 ground-truth images for each of 10,000 training objects are reported in Table 2 below. As no prior methods demonstrate the ability to generalize to such large-scale datasets, the model described herein was compared against directly sampling the 1D latent space of the base autodecoder 110 architecture (using noise vectors generated from a standard normal distribution). This method of 3D generation was shown to work reasonably well.

The disclosed methods were also evaluated with different numbers of diffusion steps (16, 32 and 64). The results can be seen in Table 2. The qualitative results showed substantially higher fidelity, quality of geometry and texture. When identities were sampled directly in the 1D latent space, the normals and depth were significantly less sharp, indicating that there exist spurious density in the sampled volumes. Table 2 further supports this observation: both the FID and KID are significantly lower than those from direct sampling, and generally improve with additional steps. The KID scores are multiplied by $10^3$.

TABLE 2

|  | CelebV-Text | | MVImgNet | | Objaverse | |
| --- | --- | --- | --- | --- | --- | --- |
| Method | FID ↓ | KID ↓ | FID ↓ | KID ↓ | FID ↓ | KID ↓ |
| Direct Latent Sampling | 69.21 | 73.74 | 97.51 | 69.22 | 72.76 | 53.68 |
| Disclosed method-16 Steps | 48.01 | 49.49 | 62.21 | 39.94 | 47.49 | 32.44 |
| Disclosed method-32 Steps | 49.74 | 46.2 | 51.26 | 28.45 | 43.68 | 31.7 |
| Disclosed Method-64 Steps | 50.27 | 47.72 | 43.85 | 23.91 | 40.49 | 29.37 |

An ablation study was conducted on the key design choices for the autodecoder 110 architecture and training. Starting with the final version, each component was subtracted. A model was then trained on the PhotoShape Chairs dataset and four images were rendered for each of the approximately 15,500 object embeddings.

Table 3 below provides the peak signal to noise ratio (PSNR) and the learned perceptual image patch similarity (LPIPS) reconstruction metrics. The final version of the process was found to significantly outperform the base architecture and training process. While the largest improvement comes from the increase in the embedding size, simply removing the multi-frame training causes a noticeable drop in quality by each metric. Interestingly, removing the self-attention layers marginally increases the PSNR and lowers the LPIPS. This is likely due to the increased complexity in training caused by these layers, which for a dataset of this size, may be unnecessary. For large-scale datasets, significant improvement with this feature were observed. Both decreasing the depth of the residual convolution blocks and reducing the embedding size cause noticeable drops in the overall quality, particularly the latter. This suggests that the additional capacity provided by these components is impactful, even on a smaller dataset.

TABLE 3

| Model Variant | PSNR↑ | LPIPS↓ |
| --- | --- | --- |
| Disclosed Method | 27.719 | 6.255 |
| Multi-Frame Training | 27.176 | 6.855 |
| Self-Attention | 27.335 | 6.738 |
| Increased Depth | 27.24 | 6.924 |
| Embedding Length (1024→64) | 25.985 | 8.332 |

In Table 3, "-" indicates this component has been removed. As each element is removed sequentially, the top row depicts results for the unmodified architecture and training procedure. LPIPS results are multiplied by $10^2$.

Figure 2:
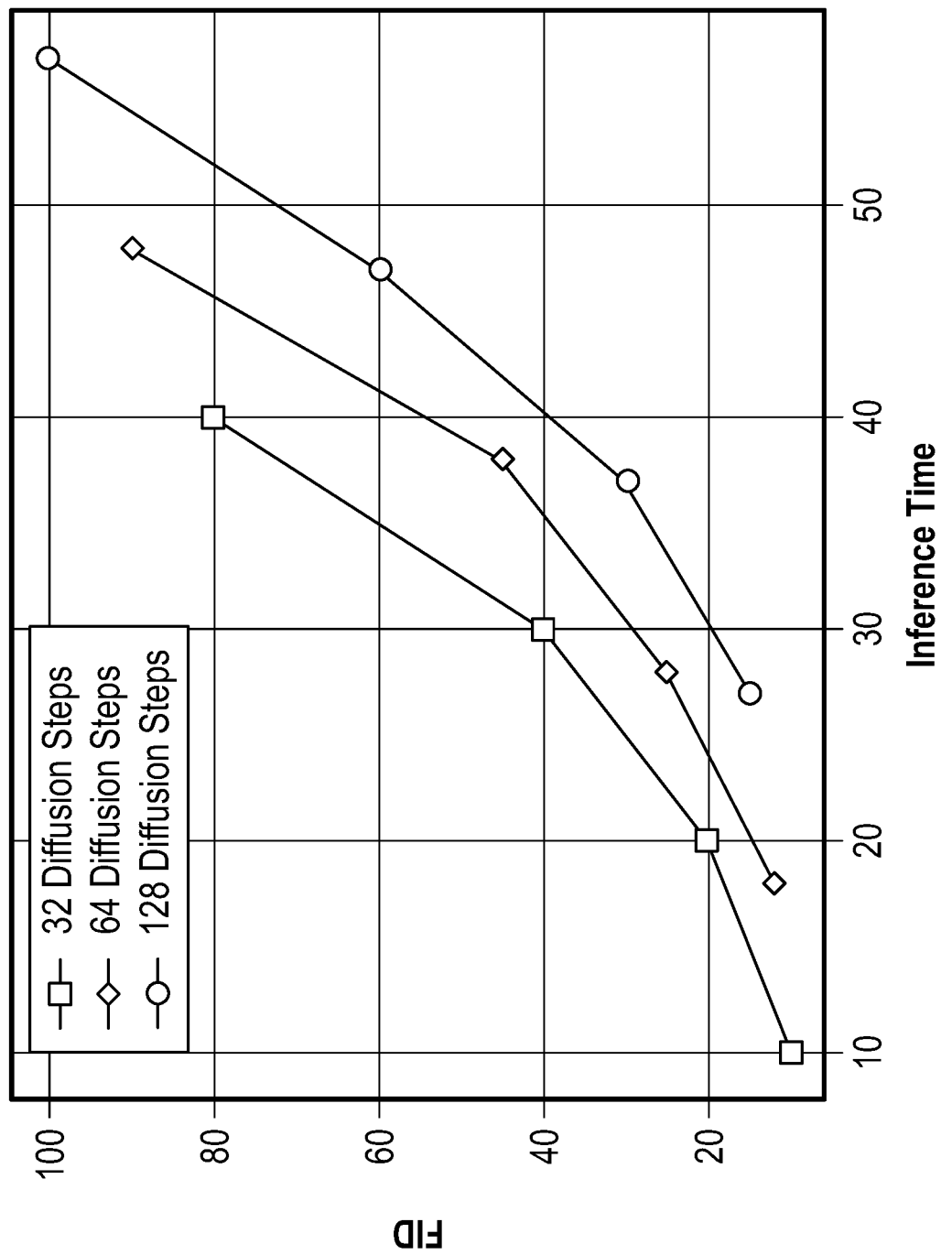
FIG. 2 is a chart illustrating the impact of diffusion resolution and the number of sampling steps on sample quality and inference time for sample methods.

Ablation on the diffusion process was also performed to evaluate the effect of the choice of the number of diffusion steps (16, 32, and 64) and the autodecoder resolution at which diffusion is performed ($4^3$, $8^3$, and $16^3$). For these variants, the generation quality training and evaluation protocol ws followed on the PhotoShape Chairs, except that stochasticity was disabled in the sampling during inference for more consistent performance across these tests. Each model was trained using roughly the same amount of time and computation. FIG. 2 illustrates the impact of diffusion resolution and the number of sampling steps on sample quality and inference time for the methods of sample configurations.

A clear distinction can be seen in FIG. 2 between the results obtained from diffusion at the earlier or later autodecoder stages, and those from the results of the disclosed methods with resolution $8^3$. At lowest resolution layers overfit to the training dataset, thus when processing novel objects via diffusion, the quality degrades significantly. Training at a higher resolution requires substantial resources, limiting the convergence seen in a reasonable amount of time. The number of sampling steps has a smaller, more variable impact. Going from 16 to 32 steps improves the results with a reasonable increase in inference time, but at 64 steps, the largest improvement is at the $16^3$ resolution, which requires more than 30 seconds per sample. The chosen diffusion resolution of $8^3$ achieves the best results, allowing for high sample quality at 64 steps with only approximately 8 seconds of computation, but provides reasonable results with 32 steps in approximately 4 seconds.

Figure 3:
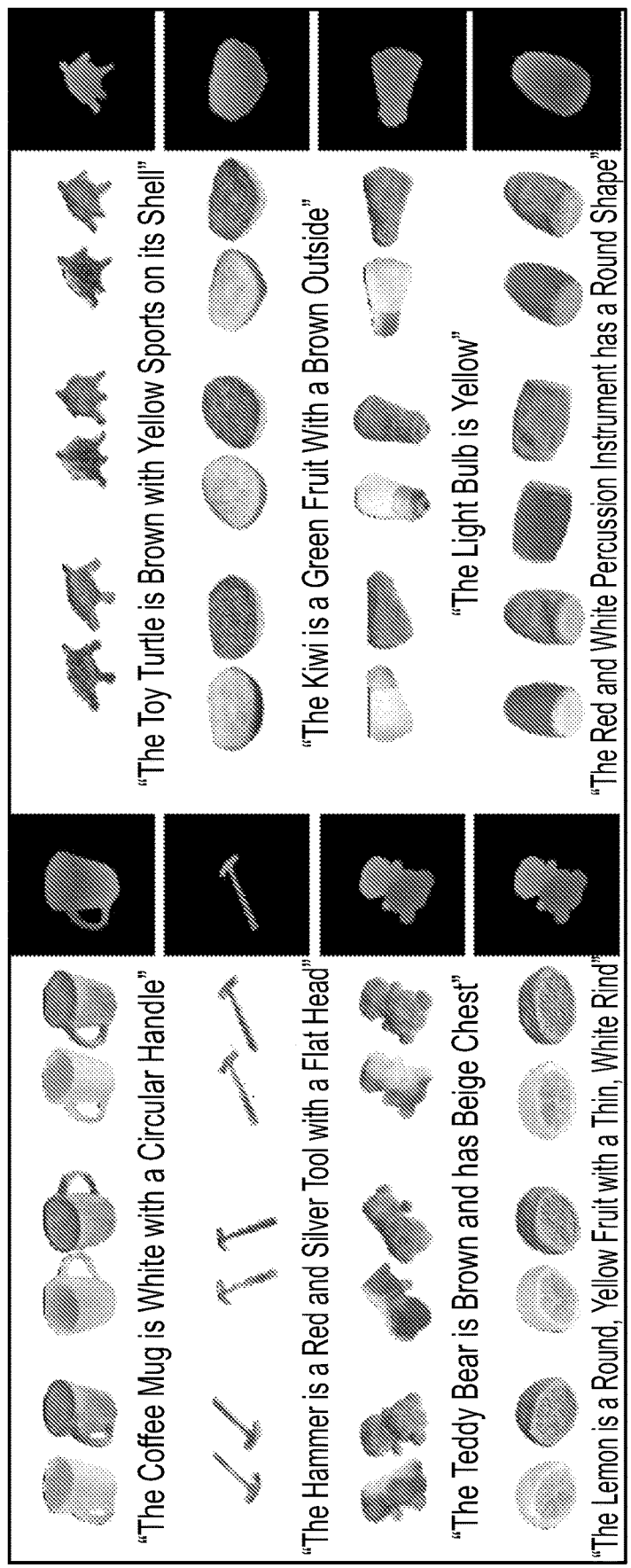
FIG. 3 is an illustration depicting generated samples from a model trained using monocular videos from MVImgNet.
Figure 4:
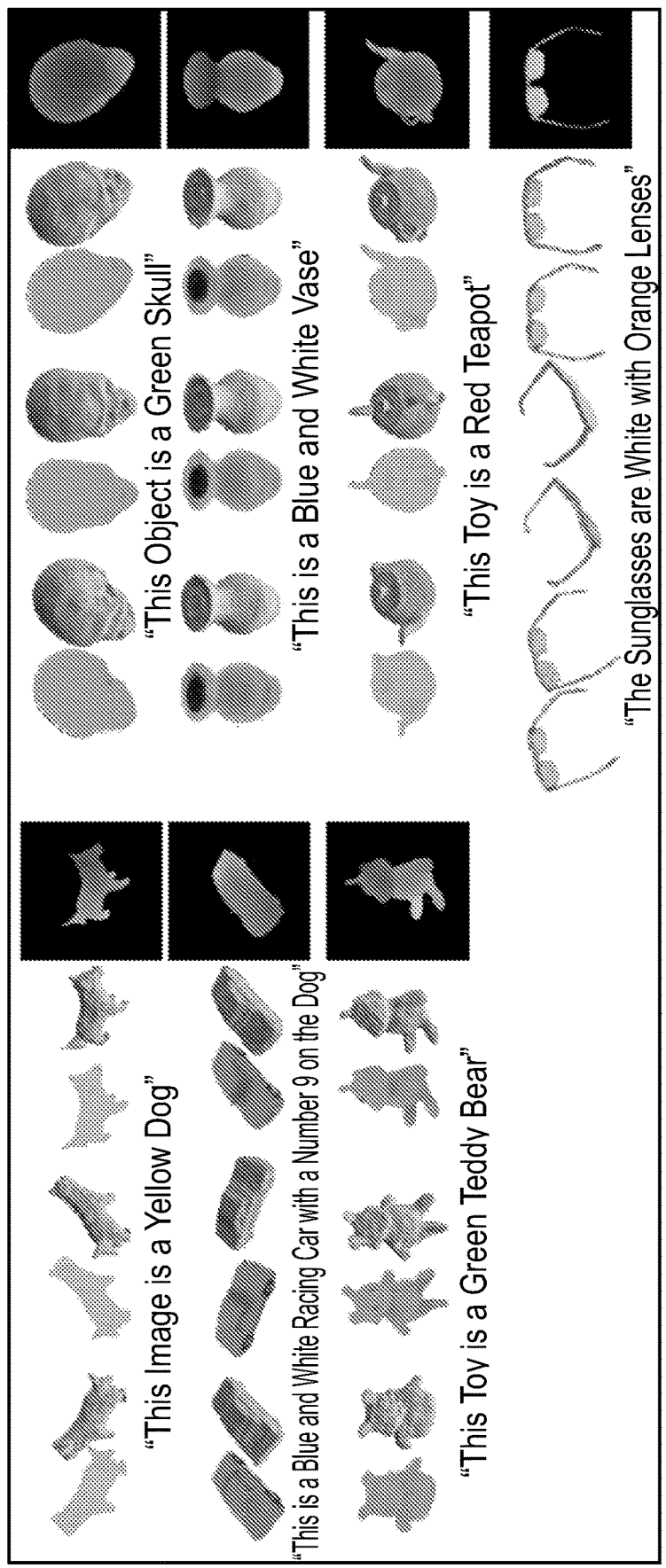
FIG. 4 is an illustration depicting generated samples from a model trained using rendered images from Objaverse.

Finally, diffusion models were trained with text-conditioning. For MVImgNet and Objaverse, the text was generated with an off-the-shelf captioning system. Qualitative results for MVImgNet and Objaverse are shown in FIGS. 3 and 4, respectively. FIG. 3 shows generated samples from a model trained using monocular videos from MVImgNet, while FIG. 4 shows generated samples of the model trained using rendered images from Objaverse. In FIGS. 3 and 4, three views are shown for each object, along with the normals for each view. Depth is also shown for the rightmost view as well as text-conditioned results. Ground-truth captions are generated by MiniGPT-4. It can be seen that in all cases, the disclosed methods generate objects with reasonable geometry that generally follow the prompt. However, some details can be missing. The disclosed model appears to learn to ignore certain details from text prompts, as MiniGPT-4 often hallucinates details inconsistent with the object's appearance. Better captioning systems should help alleviate this issue in the future.

Despite the inherent challenges in performing flexible 3D content generation for arbitrary content domains without 3D supervision, the methods described herein demonstrate this is possible with the right approach. By exploiting the inherent power of autodecoders to synthesize content in a domain without corresponding encoded input, the disclosed methods learn representations of the structure and appearance of diverse and complex content suitable for generating high-fidelity 3D objects using only 2D supervision. The latent volumetric representation is conducive to 3D diffusion modeling for both conditional and unconditional generation, while enabling view-consistent rendering of the synthesized objects. As seen in the results, this generalizes well to various types of domains and datasets, from relatively small, single-category, synthetic renderings to large-scale, multi-category real-world datasets. It also supports the challenging task of generating articulated moving objects from videos. These problems are addressed in a single framework.

The disclosed methods focus on images and videos with foregrounds depicting one key person or object. The generation or composition of more complex, multi-object scenes is a challenging task and an interesting direction for future developments. As the methods use multi-view or video sequences of each object in the dataset for training, single-image datasets are not supported. Learning the appearance and geometry of diverse content for controllable 3D generation and animation from such limited data is quite challenging, especially for articulated objects. However, using general knowledge about shape, motion, and appearance extracted from datasets like those used herein to reduce or remove the multi-image requirement when learning to generate additional object categories may be feasible for such purposes. This would allow the generation of content learned from image datasets of potentially unbounded size and diversity.

Volumetric Rendering

As noted above, learnable volumetric rendering is used to generate the final images from the final decoded volume. Given a camera intrinsic and extrinsic parameters for a target image, and the radiance field volumes generated by the autodecoder 110, for each pixel in the image, a ray is cast through the volume, sampling the color and density values to compute the color C(r) by integrating the radiance along the ray r(t)=o+td, with near and far bounds $t_n$ and $t_f$:

$$C(r) = \int_{t_n}^{t_f} T(t)\delta(r(t))c(r(t), d)dt, \quad (3)$$

where δ, c are the density and RGB values from the radiance field volumes sampled along these rays, and $T(t)=\exp-\int_{t_n}^{t} \sigma(r(s))ds$ is the accumulated transmittance between $t_n$ and t.

To supervise the silhouette of objects, the 2D occupancy map O is also rendered using the volumetric equation:

$$O(r) = \int_{t_n}^{t_f} T(t)\delta(r(t))dt. \quad (4)$$

128 points are sampled across these rays for radiance field rendering during training and inference.

Articulated Animation

As the techniques described herein are flexibly designed to support both rigid and articulated subjects, different approaches may be employed for pose supervision to better handle each of these cases.

For articulated subjects, poses may be estimated during training, using a set of learnable 3D keypoints $K^{3D}$ and their predicted 2D projections $K^{2D}$ in each image in an extended version of the Perspective-n-Point (PnP) algorithm. To handle articulated animation, however, rather than learn a single pose per image using these points, it is assumed that the target subjects can be decomposed into $N_p$ regions, each containing $N_k$ $K_p^{3D}$ points and their corresponding $K_p^{2D}$ projections per image. These points are shared across all subjects, and are aligned in the learned canonical space, allowing for realistic generation and motion transfer between these subjects. This allows for learning $N_p$ poses per-frame defining the pose of each region p relative to its pose in the learned canonical pose.

Successful reconstruction of the training images for each subject includes learning the appropriate canonical locations for each region's 3D keypoints, to predict the 2D projections of these keypoints in each frame, and the pose best matching the 3D points and 2D projections for these regions. This information is then used in the volumetric rendering framework to sample appropriately from the canonical space such that the subject's appearance and pose are consistent and appropriate throughout their video sequence. Using this approach, this information can be learned along with the autodecoder parameters for articulated objects using the reconstruction and foreground supervision losses used for the rigid object datasets.

As noted above, to better handle non-rigid shape deformations corresponding to this articulated motion, volumetric linear blend skinning (LBS) may be employed. This allows the weight each component p in the canonical space contributes to a sampled point in the deformed space based on the spatial correspondence between these two spaces to be learned:

$$x_d = \sum_{p=1}^{N_p} w_p^c(x_c)(R_p x_c + p), \quad (5)$$

where $T_p=[R_p, t_p]=[R^{-1}, -R^{-1}]$ is the estimated pose of part p relative to the camera (where $T=[R,] \in \mathbb{R}^{3 \times 4}$ is the estimated camera pose with respect to the canonical volume); $x_d$ is the 3D point deformed to correspond to the current pose; $x_c$ is its corresponding point when aligned in the canonical volume; and $w_p^c(x_c)$ is the learned LBS weight for component p, sampled at position $x_c$ in the volume, used to define this correspondence. It is noted that an approximate solution may be computed using the inverse LBS weights following Human NeRF to avoid the excessive computation used by the direct solution.

Thus, for non-rigid subjects, in addition to the density and color volumes needed to integrate Eqns. 3 and 4 above, the autodecoder 110 learns to produce a volume $V^{LBS} \in \mathbb{R}^{S^3 \times N_p}$ containing the LBS weights for each of the $N_p$ locally rigid regions constituting the subject. The deformation can be completely described by establishing correspondences between each point $x_d$ in the deformed space and points $x_c$ in the canonical space. Such correspondence is established through Linear Blend Skinning (LBS) as follows:

$$x_d = \sum_{p=1}^{N_p} w_p^c(x_c)(R_p x_c + p), \quad (6)$$

where $w_p^c(x)$ is a weight assigned to each part p. Intuitively, LBS weights segment the object into different parts. As an example, a point with LBS weight equal to 1.0 for the left hand will always move according to the transformation for the left hand. Unfortunately, during volumetric rendering canonical points are typically queried using points in the deformed space, requiring solving Eq. (6) for $x_c$. This procedure is prohibitively expensive, so the approximate solution may be used that defines inverse LBS weights $w_p^d$ such that:

$$x_c = \sum_{p=1}^{N_p} w_p(x_d)\left(R_p^{-1} x_d - R_p^{-1}{}_p\right), \quad (7)$$

where weights $w_p^d$ are defined as follows:

$$w_p(x_d) = \frac{w_p^c\left(R_p^{-1} x_d - R_p^{-1}{}_p\right)}{\sum_{p=1}^{N_p} w_p^c\left(R_p^{-1} x_d - R_p^{-1}{}_p\right)}. \quad (8)$$

This approximation has an intuitive explanation, i.e. given the deformed point, it is projected using the inverse $T_p$ to the canonical pose and checked if it corresponds to the part p in canonical pose.

In a sample test configuration, $N_k = 125$ 3D keypoints were assigned to each of the $N_p = 10$ regions. For these tests, fixed camera intrinsics with a field-of-view of 0.175 radians were assumed. Camera poses have been estimated during training and the training accelerated using learned 3D keypoints for each estimated region of the depicted subject and their predicted 2D projections with the differentiable Perspective-n-Point (PnP) algorithm implementation from PyTorch3D. As this suffices for objects with standard canonical shapes (e.g., human faces) performing non-rigid motion in continuous video sequences, this approach was employed for the tests on the CelebV-Text dataset. While in theory, such an approach could be used for pose estimation for rigid objects (with only 1 component) in each view, this approach may be less reliable for the rigid object datasets, which contain sparse, multi-view images from randomly sampled, non-continuous camera poses, depicting content with drastically varying shapes and appearances (e.g., the multi-category object datasets described below). Thus, for these objects, either known ground-truth or estimated camera poses were used as input for synthetic renderings or real images, respectively. Those skilled in the art will recognize that category-agnostic object or camera pose estimation without predefined keypoints from sparse images of arbitrary objects or scenes also may be employed.

Architecture Features

For the volumetric autodecoder 110 architecture described above, given an embedding vector e of size 1024, a fully-connected layer may be used followed by a reshape operation to transform it into a $4^3$ volume with 512 features per cell. This is followed by a series of four 3D residual blocks, each of which upsamples the volume resolution in each dimension and halves the features per cell, to a final resolution of 643 and 32 features. These blocks consist of two 3×3×3 convolution blocks each followed by batch normalization in the main path, while the residual path consists of four 1×1×1 convolutions, with a rectified linear activation unit (ReLU) function applied after these operations. After the first of these blocks, the $8^3$ volume may be obtained with 256 features per cell used for training the diffusion network. In this and the subsequent block, self-attention layers are applied. After the final upsampling block, a final batch normalization is applied followed by a 1×1×1 convolution to produce the final 1+3 density $V^{Density}$ and RGB color features $V^{RGB}$ used in the volumetric renderer.

For non-rigid subjects, the architecture produces 1+3+10 output channels, with the latter group with the LBS weights for the $n_p=10$ locally rigid components each region corresponds to in the canonical space. The unsupervised 2D keypoint predictor uses the U-Net architecture, which operates on a downsampled 64×64 input image to predict the locations of the keypoints corresponding to each of the 3D keypoints used to determine the pose of the camera relative to each region of the subject when it is aligned in the canonical volumetric space.

For the base diffusion model architecture, the Ablated Diffusion Model (ADM) may be used, which is a U-Net architecture originally designed for 2D image synthesis. Preconditioning enhancements to this model may be incorporated. As this architecture was originally designed for 2D, all convolutions and normalizations operations, as well as the attention mechanisms, are adapted to 3D. For the cross-attention mechanism used for the conditioning experiments, the latent-space cross-attention mechanism is likewise extended to the 3D latent space.

Ablating the Latent Volume Resolution Used for Diffusion

Figure 5:
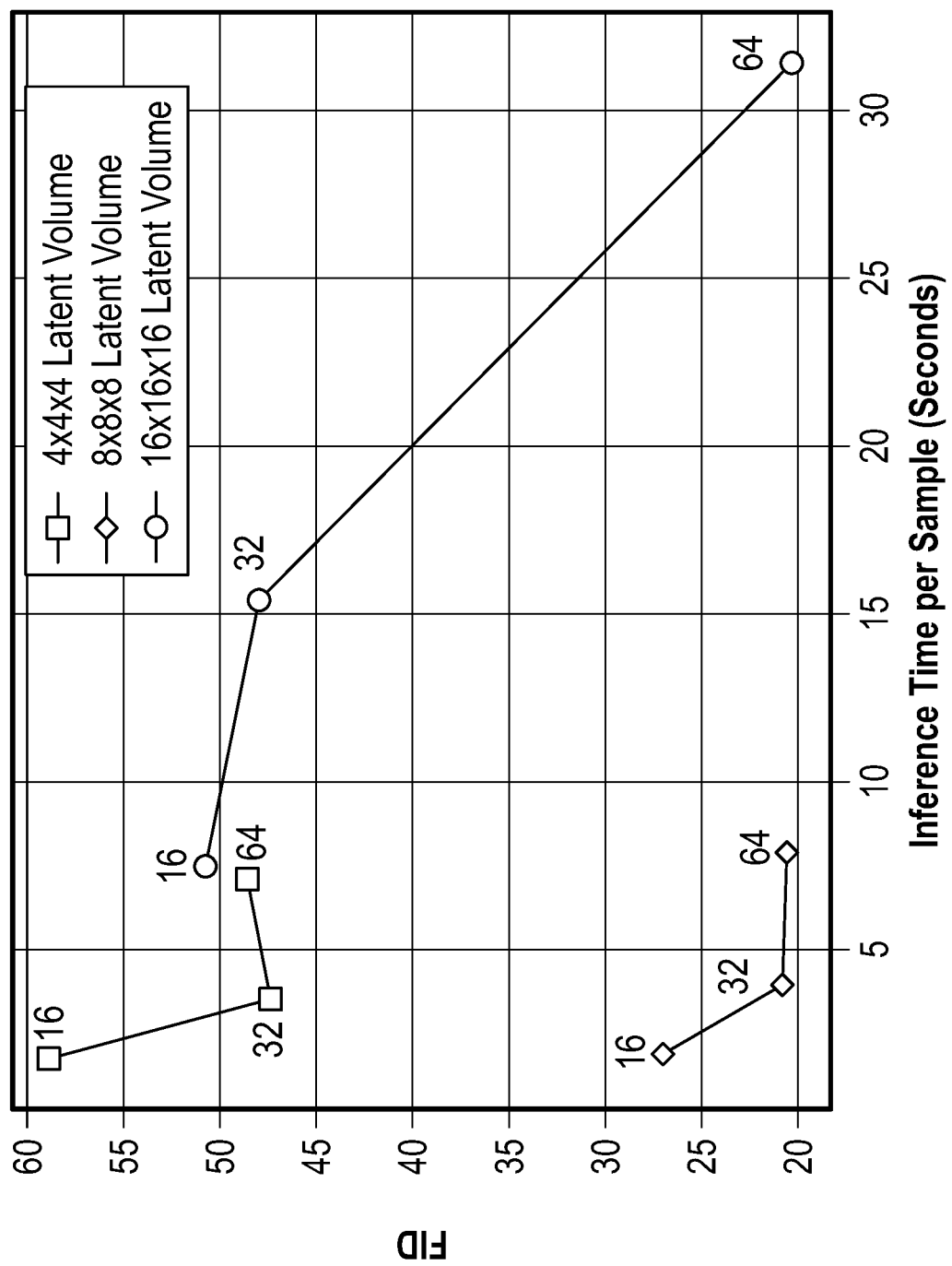
FIG. 5 is a graph comparing three diffusion models that were trained for the same time, resources, and number of parameters, for diffusion at 3 resolutions in the autodecoder: $4^3$, $8^3$, and $16^3$, with the $8^3$ model showing the best trade off quality and training speed, rendering it the best option for training on large-scale 3D datasets.

Three diffusion models were trained for the same time, resources, and number of parameters, for diffusion at 3 resolutions in the autodecoder 110: $4^3$, $8^3$, and $16^3$. It was found that the $4^3$ models, even when they train faster, often fail to converge to something meaning full and produce partial results. Most samples produced by the $16^3$ models were of reasonable quality. However, many samples also exhibited spurious density values. As illustrated in FIG. 5, the $8^3$ diffusion model produced the best results, and its fast training speed makes it suitable for large-scale training.

Preparing Text Embeddings for Text-Driven Generation

The model was trained for text-conditioned image generation on three datasets: CelebV-Text, MVImgNet, and Objaverse. The two latter datasets provide the object category of each sample, but they do not provide text descriptions. Using MiniGPT4, a description was extracted by providing a hint and the first view of each object along with the question: "<Img><ImageHere></Img> Describe this <hint> in one sentence. Describe its shape and color. Be concise, use only a single sentence." For MVImgNet, this hint is the "class name", while it is the "asset name" for Objaverse. The assigned description may then be used in the inference stage to identify the object to be rendered.

With the text-image pairs for these three datasets, the 11-billion parameter T5 model was used to extract a sequence of text-embedding vectors. The dimensionality of these vectors was 1024. During training, the length of the embedding sequence was fixed to 32 elements. Longer sentences were trimmed and smaller sentences were padded with zeroes.

Hash Embedding

Each object in the training set was encoded by an embedding vector. However, as multi-view datasets of various scales were employed, up to approximately 300,000 unique targets from multiple categories, storing a separate embedding vector for each object depicted in the training images is burdensome. As such, a technique may be used enabling the effective use of a significantly reduced number of embeddings (no more than approximately 32,000 needed for any of the evaluations), while allowing effective content generation from large-scale datasets. Concatenations of smaller embedding vectors were employed to create more combinations of unique embedding vectors used during training. For an embedding vector length $l_v$, the input embedding vector $H_k \in \mathbb{R}^l$ used for an object to be decoded is a concatenation of smaller embedding vectors $h_i^j$, where each vector is selected from an ordered codebook with $n_c$ entries, with each entry containing collection of $n_h$ embedding vectors of length $l_v/n_c$:

$$H_k = \left[h_1^{k_1}, h_2^{k_2}, \ldots, h_{n_c}^{k_{n_c}}\right], \quad (9)$$

where $k_i \in \{1, 2, \ldots, n_h\}$ is the set of indices used to select from the $n_h$ possible codebook entries for position i in the final vector. This method allows for exponentially more combinations of embedding vectors to be provided during training than must be stored in learned embedding vector library.

However, while the index j for the vector $h_i^j$ at position i may be randomly selected for each position to access its corresponding codebook entry, the inventors instead used a deterministic mapping from each training object index to its corresponding concatenated embedding vector. This function is implemented using a hashing function employing a multiplication method for fast indexing using efficient bitwise operations. For object index k, the corresponding embedding index is:

$$m(k) = [(a \cdot k) \bmod 2^w] \gg (w - r), \quad (10)$$

where the table has $2^r$ entries. w and a are heuristic hashing parameters used to reduce the number of collisions while maintaining an appropriate table size. 32 was used for w, while a must be an odd integer between $2^{w-1}$ and $2^w$. Each smaller codebook was given its own a value:

$$a_i = 2^{w-1} + 2 * i^2 + 1, \quad (11)$$

where i is the index of the codebook. It was found that employing this approach had negligible impact on the overall speed and quality of the training and synthesis process. Using this hash embedding approach was found to reduce the model storage needs by approximately 75% for this dataset.

Processing Platform

Figure 6:
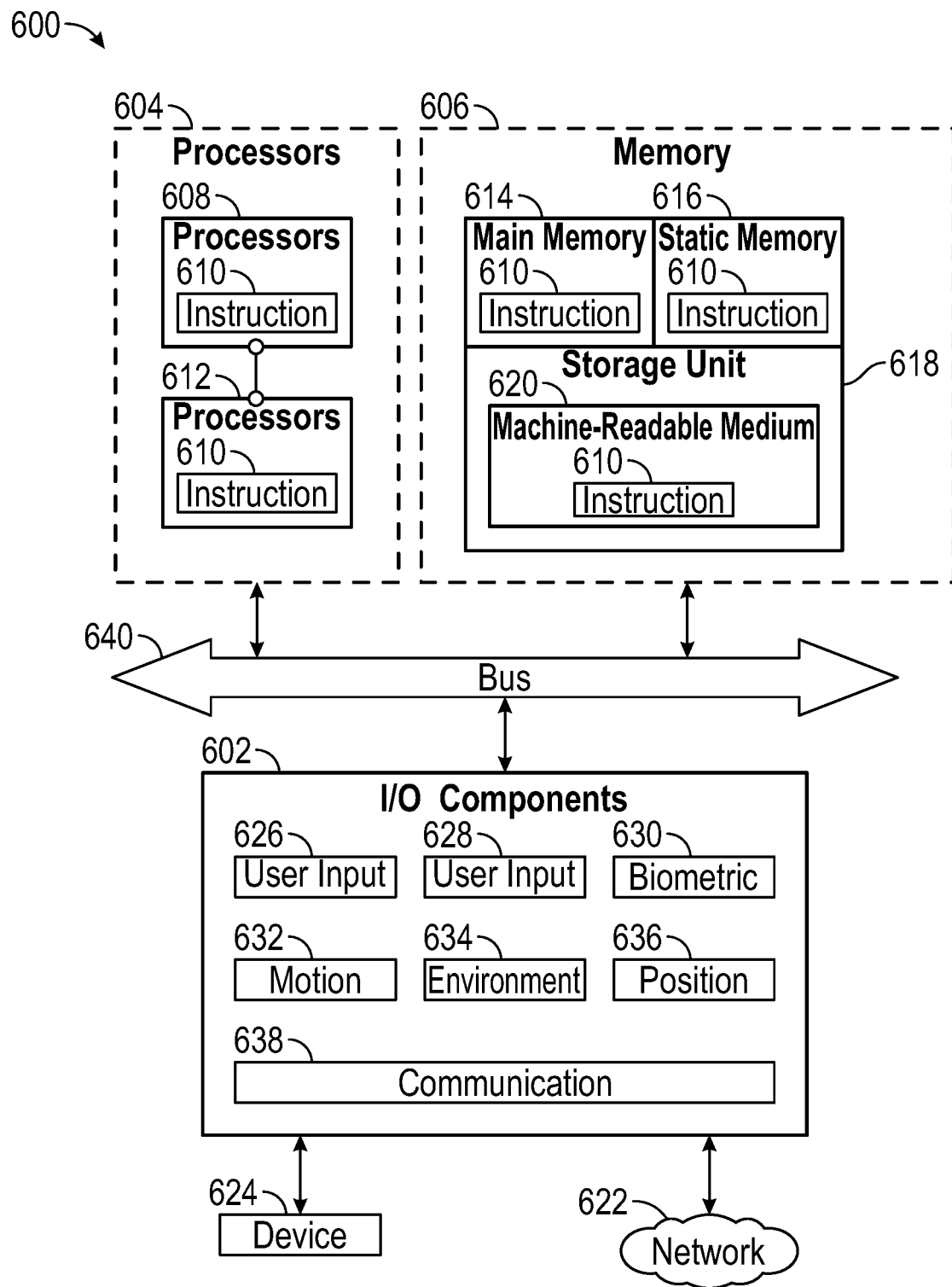
FIG. 6 is a block diagram of a machine within which instructions (e.g., software, a program, an application, an applet, an app, or other executable code) for causing the machine to perform one or more of the methodologies discussed herein may be executed.

FIG. 6 is a diagrammatic representation of the machine 600 within which instructions 610 (e.g., software, a program, an application, an applet, an app, or other executable code) for causing the machine 600 to perform one or more of the methodologies discussed herein may be executed. For example, the instructions 610 may cause the machine 600 to execute one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may include, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform one or more of the methodologies discussed herein. The machine 600, for example, may implement the two-stage pipeline 100 of FIG. 1A. In some examples, the machine 600 may also include both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may include two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 for one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

Any biometric data collected by the biometric components 630 is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi© components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Figure 7:
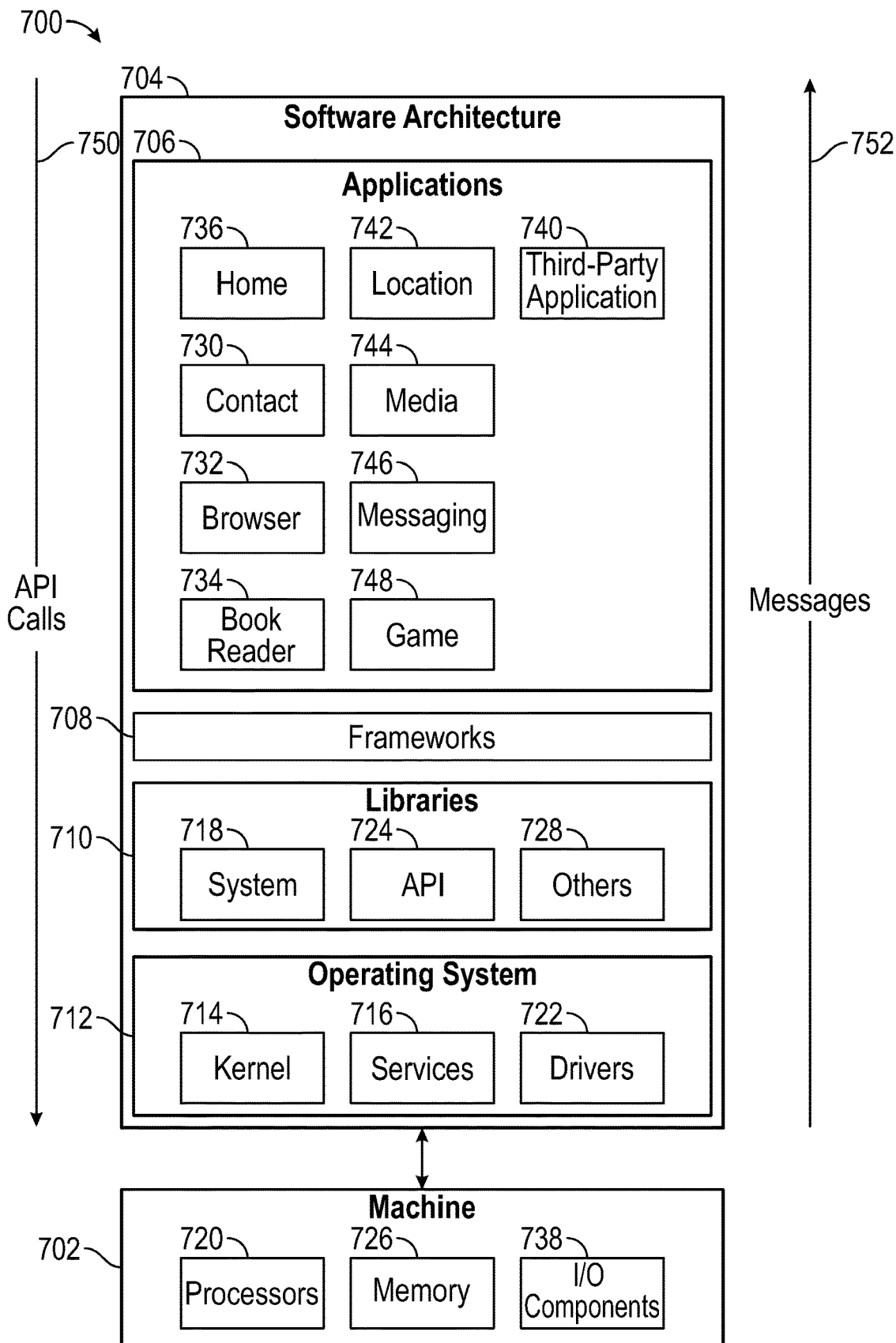
FIG. 7 is a block diagram showing a software architecture within which examples described herein may be implemented.

FIG. 7 is a block diagram 700 illustrating a software architecture 704, which can be installed on one or more of the devices described herein. The software architecture 704 is supported by hardware such as a machine 702 (see FIG. 6) that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to generate one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 740 can invoke the API calls 750 provided by the operating system 712 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component includes a general-purpose processor configured by software to become a special-purpose processor, the general-purpose processor may be configured as respectively different special-purpose processors (e.g., including different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of training a three-dimensional (3D) diffusion model to embed properties from two-dimensional (2D) images learned from a target dataset in a latent space using an autodecoder, comprising:
processing embedding vectors of an autodecoder (G) comprising a library of embedding vectors corresponding to objects in a training dataset to generate a latent 3D feature volume;
decoding, by the autodecoder, the latent 3D feature volume into a 3D voxel grid for density and radiance representative of an object's shape and appearance;
splitting the autodecoder into a first part $G_1$ and a second part $G_2$; t,?
normalizing features before using features F from the latent 3D feature volume for diffusion by the 3D diffusion model, where median m is a center of distribution of the latent 3D feature volume and a Normalized InterQuartile Range (IQR) approximates a scale of the latent 3D feature volume:
training, using the autodecoder, the 3D diffusion model operating in a 3D latent space obtained from the first part $G_1$ using volumetric rendering of the 3D voxel grid with two-dimensional (2D) reconstruction supervision from training images in a training dataset to extract structure and appearance properties from the training dataset; and
generating, using the second part $G_2$ and the structure and appearance properties extracted from the training dataset, a 3D representation of the object.

2. The method of claim 1, further comprising progressively upsampling the latent 3D feature volume before decoding the upsampled latent 3D feature volume into the 3D voxel grid.

3. The method of claim 1, further comprising, during inference, denormalizing the features F from the structure and appearance properties extracted from the training dataset by the second part $G_2$ as F×IQR+m prior to generating the 3D representation of the object.

4. The method of claim 1, further comprising learning the embedding vectors by the autodecoder.

5. The method of claim 1, wherein decoding by the autodecoder comprises providing at least four residual blocks at each resolution in the autodecoder and using self-attention layers in a second level of resolution $8^3$ and in a third level of resolution $16^3$ of the autodecoder.

6. The method of claim 1, wherein the object is in a canonical pose and training the 3D voxel grid comprises training the 3D voxel grid using ground truth poses, poses estimated using structure from motion, or poses learned from the training dataset during training.

7. The method of claim 6, wherein the canonical pose comprises a canonical voxel representation of a density grid that is a discrete representation of a density field and a canonical representation of a red, green, blue (RGB) radiance field, further comprising tri-linearly interpolating density values and RGB values from the 3D voxel grid after decoding.

8. The method of claim 1, further comprising removing a background of the training images in the training dataset prior to training the 3D diffusion model.

9. The method of claim 1, wherein the object is an articulated non-rigid object, further comprising modeling a shape of the object and local motion from dynamic poses as well as a corresponding non-rigid deformation of a local region.

10. The method of claim 9, further comprising estimating, using a differentiable Perspective-n-Point algorithm, camera poses for each component of the non-rigid object and progressively refining estimated camera poses during training using a combination of learned 3D keypoints for each component of the non-rigid object and corresponding 2D projections predicted in each image, and combining the components with plausible deformations using a learned volumetric linear blend skinning (LBS) algorithm having skinning weights for each component of the non-rigid object that are estimated during training of the 3D diffusion model.

11. The method of claim 1, further comprising representing each object in the training dataset by an embedding vector comprising a concatenation of smaller embedding vectors, wherein representing each object comprises using a deterministic mapping from each training object index to its corresponding concatenated embedding vector using a hashing function where for object index k, the corresponding embedding index is:

$$m(k) = [(a \cdot k) \bmod 2^w] \gg (w - r),$$

for a table having 2ʳ entries where w and a are heuristic hashing parameters used to reduce a number of collisions while maintaining an appropriate table size.

12. The method of claim 1, further comprising decomposing a target non-rigid object into regions, where each region contains 3D keypoints and corresponding 2D projections per image, that are shared across all non-rigid objects and aligning the non-rigid objects in a learned canonical space to allow for motion transfer between the non-rigid objects.

13. The method of claim 1, wherein the training comprises extracting a text description of an object in the training dataset by providing a hint and a first view of the object along with a question requesting a description of a shape and color of the object for use in an inference stage to identify the object.

14. A system that embeds properties learned from a target dataset in a latent space into a volumetric representation of an object for rendering, comprising:
a volumetric autodecoder (G) that learns embedding vectors of a library of embedding vectors corresponding to objects in a training dataset to generate a latent 3D feature volume and that decodes the latent 3D feature volume into a 3D voxel grid for density and radiance representative of an object's shape and appearance, the autodecoder comprising a first part $G_1$ and a second part $G_2$; and a 3D diffusion model that is trained on a latent representation by the volumetric autodecoder, the 3D diffusion model operating in a 3D latent space obtained from the first part $G_1$ using volumetric rendering of the voxel grid with two-dimensional (2D) reconstruction supervision from training images in a training dataset to extract structure and appearance properties from the training dataset, wherein the volumetric autodecoder normalizes features $$\hat{F} = \frac{(F - m)}{IQR}$$

before using features F from the latent 3D feature volume for diffusion by the 3D diffusion model, where median m is a center of distribution of the latent 3D feature volume and a Normalized InterQuartile Range (IQR) approximates a scale of the latent 3D feature volume, and wherein the second part $G_2$ of the volumetric autodecoder generates a 3D representation of the object from the structure and appearance properties extracted from the training dataset.

15. The system of claim 14, wherein the volumetric autodecoder progressively upsamples the latent 3D feature volume and performs robust normalization on the upsampled latent 3D feature volume before training the 3D diffusion model, and wherein, during inference, the features F are denormalized from the structure and appearance properties extracted from the training dataset by the second part $G_2$ as $\hat{F} \times IQR + m$ generating the 3D representation of the object.

16. The system of claim 14, wherein the volumetric autodecoder provides at least four residual blocks at each resolution in the volumetric autodecoder and includes self-attention layers in a second level of resolution $8^3$ and in a third level of resolution $16^3$.

17. The system of claim 14, wherein the object is an articulated non-rigid object, wherein the volumetric autodecoder models a shape of the object and local motion from dynamic poses as well as a corresponding non-rigid deformation of a local region, and wherein the volumetric autodecoder comprises a differentiable Perspective-n-Point algorithm that estimates camera poses for each component of the non-rigid object and progressively refines the estimated camera poses during training using a combination of learned 3D keypoints for each component of the non-rigid object and corresponding 2D projections predicted in each image, and a learned volumetric linear blend skinning (LBS) algorithm that combines the components with plausible deformations using skinning weights for each component of the non-rigid object that are estimated during training of the 3D diffusion model.

18. The system of claim 14, wherein the 3D diffusion model represents each object in the training dataset by an embedding vector comprising a concatenation of smaller embedding vectors, further comprising an encoder that encodes each object using a deterministic mapping from each training object index to its corresponding concatenated embedding vector using a hashing function where for object index k, the corresponding embedding index is:

$$m(k) = [(a \cdot k) \bmod 2^w] \gg (w - r),$$

for a table having $2^r$ entries where w and a are heuristic hashing parameters used to reduce a number of collisions while maintaining an appropriate table size.

19. A non-transitory computer-readable storage medium, the computer-readable storage medium including instructions that when executed by a processor cause the processor to implement a method of training a three-dimensional (3D) diffusion model to embed properties from two-dimensional (2D) images learned from a target dataset in a latent space using an autodecoder, by performing operations comprising:

processing embedding vectors of an autodecoder (G) comprising a library of embedding vectors corresponding to objects in a training dataset to generate a latent 3D feature volume;

decoding, by the autodecoder, the latent 3D feature volume into a 3D voxel grid for density and radiance representative of an object's shape and appearance;

splitting the autodecoder into a first part $G_1$ and a second part $G_2$;

normalizing features $$\hat{F} = \frac{(F - m)}{IQR}$$

before using features F from the latent 3D feature volume for diffusion by the 3D diffusion model, where median m is a center of distribution of the latent 3D feature volume and a Normalized InterQuartile Range (IQR) approximates a scale of the latent 3D feature volume:

training, using the autodecoder, the 3D diffusion model operating in a 3D latent space obtained from the first part $G_1$ using volumetric rendering of the voxel grid with two-dimensional (2D) reconstruction supervision from training images in a training dataset to extract structure and appearance properties from the training dataset; and generating, using the second part $G_2$ and the structure and appearance properties extracted from the training dataset, a 3D representation of the object.

* * * * *